United States Patent [19]

Yoshizawa et al.

[11] Patent Number: 5,442,561
[45] Date of Patent: Aug. 15, 1995

[54] PRODUCTION MANAGEMENT SYSTEM AND ITS APPLICATION METHOD

[75] Inventors: Masahiro Yoshizawa, Isehara; Tetsuma Sakurai, Tokyo, both of Japan

[73] Assignee: Nippon Telegraph and Telephone Corporation, Tokyo, Japan

[21] Appl. No.: 58,175

[22] Filed: May 10, 1993

[30] Foreign Application Priority Data

| May 12, 1992 | [JP] | Japan | 4-119151 |
| Dec. 3, 1992 | [JP] | Japan | 4-324123 |
| Mar. 12, 1993 | [JP] | Japan | 5-051715 |

[51] Int. Cl.⁶ .................................................. G06F 15/46
[52] U.S. Cl. ..................................... 364/468; 364/478; 364/403
[58] Field of Search ............... 364/468, 131, 478, 401, 364/403, 138

[56] References Cited

U.S. PATENT DOCUMENTS

| 5,148,370 | 9/1992 | Litt et al. | 364/468 |
| 5,216,612 | 6/1993 | Cornett et al. | 364/468 |
| 5,233,533 | 8/1993 | Edstrom et al. | 364/468 |
| 5,233,534 | 8/1993 | Osthus et al. | 364/468 |
| 5,280,425 | 1/1994 | Hogge | 364/402 |
| 5,282,139 | 1/1994 | Kobayashi | 364/468 |
| 5,283,745 | 2/1994 | Cummings et al. | 364/468 |

OTHER PUBLICATIONS

Nakase et al., "Method of Quick Turn Around Time Production for ASIC Wafer Process", 1992 Technical Proceedings Semicon/Japan 121-156 (Dec. 3, 1992).
Yosizawa et al., "LSI Line Control System Focused on TAT Control", Proceedings of the 1993 IEICE Spring Conference 5-332 (Mar., 1993).

Primary Examiner—Roy N. Envall, Jr.
Assistant Examiner—Cameron H. Tousi
Attorney, Agent, or Firm—Sterne, Kessler, Goldstein & Fox

[57] ABSTRACT

Production schedules are executed for production machines and lots having high importance or priority from among lots being objects of production process by the production machines, and progress of production process is managed by a scheduler based on the production schedules. For those lots whose progresses are delayed, the production schedules are automatically adjusted by the scheduler so that the delays can be eliminated.

10 Claims, 27 Drawing Sheets (a) PHOTORESIST COATING (b) MASK ALIGNMENT, EXPOSURE LIGHT

DISSOLVES IN DEVELOPER AFTER EXPOSURE (c) PATTERNING (d) PROCESSING, REMOVAL OF PATTERN

| NUMBER | PROCESS NAME | EQUIPMENT | RECIPE | PROCESS TIME |
|---|---|---|---|---|
| 1 | WASHING | WASHING MACHINE A | A-1 | 01:10:00 |
| 2 | OXIDATION | ELECTRIC FURNACE | SIO2-1 | 01:40:00 |
| 3 | RESIST COATING | COATER 1 | COAT-1 | 00:30:00 |
| 4 | EXPOSURE | STEPPER 1 | MARK1 | 00:40:00 |
| | ‥‥‥ | ‥‥‥ | ‥‥‥ | ‥‥‥ |

FIG. 2 (PRIOR ART)

PRODUCTION MANAGEMENT SYSTEM AND ITS APPLICATION METHOD

BACKGROUND OF THE INVENTION

1. Field of the Invention

The present invention relates to a production management system for controlling the production of various industrial products such as semiconductor components, e.g., LSI, clothes, and automobiles. The term "production management" or "management of manufacture" as used herein includes (1) so-called scheduling for the determination of order of manufacture of multi-kind products depending on respective process steps or degrees of urgency, (2) monitoring progressive condition of manufacture, and (3) collection of processing data upon manufacture.

2. Description of the Prior Art

Conventional production management system will be described taking an example of manufacturing process steps for manufacturing an LSI.

FIG. 1A is a flow chart schematically illustrating a manufacturing procedure for manufacturing an LSI, and FIG. 1B is a cross sectional view showing a semiconductor substrate being processed for manufacturing a bipolar LSI, with illustrating in more detail the step of photolithography illustrated in FIG. 1A.

Generally, various technologies are applied to process a monocrystalline wafer at least once, and up to several tens times on the larger side in order to make up a fine structure on the semiconductor substrate so that it can exhibit desired functions, thus completing manufacture of an LSI. The technologies include formation of an insulation film such as an oxide film/nitride film, photolithography, diffusion by heat treatment, pattern formation by photolithography, film formation by vapor deposition or sputtering, etching, introduction of impurities by ion implantation, scribing (division), mounting, bonding, etc. As illustrated in FIG. 1A, LSI manufacturing procedure includes a plurality of steps of processing a monocrystalline wafer 1, for example, for obtaining a bipolar LSI, steps of oxidation 2, photolithography 3, burying diffusion 4, epitaxial growth 5, oxidation 6, . . . , photolithography 7, base diffusion 8, photolithography 9, emitter diffusion 10, photolithography 11, metal deposition 12, photolithography 13, alloying 14, scribing 15, mounting 16, bonding/inclusion 17, and product test/reliability test 18 to obtain a product 19, and for obtaining a MOS LSI, steps of photolithography 20, source drain diffusion 21, epitaxial growth 22, oxidation 23, . . . , photolithography 24, metal deposition 25, and photolithography 26, instead of the steps 3 to 13 in the manufacture of a bipolar LSI, to obtain the product 19.

Each technology in the procedure illustrated in FIG. 1A is subdivided into several treatments. For example, the photolithography is comprised, as illustrated in FIG. 1B, by (a) coating of a resist which is a photosensitive composition: a silicon substrate 30 having an oxide layer 31 is provided with a photoresist film 32 on the surface of the oxide layer; (b) alignment of a mask/exposure: a mask 33 having an imagewise pattern is arranged in alignment above the photoresist film 32, light is irradiated through the mask 33 so that the photoresist film 32 is imagewise exposed, and the exposed portion is dissolved in a developer to transfer the pattern; (c) pattern formation by development: patterning is performed by photolithography (d) processing by etching: the exposed portion of the oxide film is etched off, etc. Unit of such procedure is usually called "step". LSIs can be fabricated by repeating such steps several hundreds of times. List of the procedure of the manufacturing process steps is a "process table" as shown in FIG. 2. The process table describes contents of process which include at least machines used, recipes, etc. in the order of process.

The process table is assigned to each lot, i.e., process unit: usually for each cassette, or for each sheet in case of a sheet-fed process), and LSIs can be fabricated by performing the process in order as prescribed in the process table. What is characteristic here is that in the process, the same machine is used more than once, usually, many times, under different conditions or recipes. In case different types of machines are used or different types of products are to be fabricated, fabrication in the same step proceeds under different recipes. The term "recipe" as used herein refers to conditions including not only manufacturing conditions such as oxidation or annealing temperature, gas flow rate, and kind of mask used upon exposure, but also testing conditions such as position at which measurement of size is performed. Thus, the manufacturing process for LSI is a very complicated manufacturing line whose control is far more complicated since it involves many elements and a permutation/combination of many elements must be controlled.

Recently, diversification of products, and immediate response to needs of customers have been desired not only in the field of LSI but also in various other fields. Accordingly, demands in LSI production management are shifting from management for increasing the production efficiency by automation of transportation to delivery date management, and TAT (turn around time) management. In accordance with increased diversification of products, there has been an increasing tendency that many types of products are manufactured in a single production line. In addition, not only products differ in their throughputs but also processes differ in their importance and priority from kind to kind. Importance depends on added value such as design costs for masks, etc., manufacture costs for special steps, and is determined usually when normal lots are input. On the other hand, priority, which indicates which one should precede when a plurality of steps are competitively awaiting for a process to be performed in the same machine, is determined depending on allowance till delivery date. Thus, even when a lot has been assigned low priority since a full allowance in time till delivery date was expected originally, it will be often the case that the priority of the lot must be increased because of a delay from the previous arrangement or schedule which occurred in the midway, or conversely, the priority of the lot must be decreased due to the occurrence of ample time margins for delivery.

It is useful to collect and monitor process execution data not only for preventing the occurrence of faulty products but also for the analysis of causes of troubles when such occur. Therefore, it is indispensable to collect process data including test data. It is desirable but not mandatory to collect the process data automatically from the machines. Upon collection of process data and test data, the same machine is used many times repeatedly in the step concerned, and hence key (keyword) information is attached to the data that enables identification of a particular step in a particular lot, i.e., indication of the position of the step concerned in the process table, before the data can be stored. It is a simpler and easier way to use a process schedule being executed as the key information. More specifically, upon lot processing, a particular lot is recognized by a bar code reader, the process schedule of the lot is received through a network communication, and stored together with the process data in a data base. Alternatively, a magnetic card is transported together with a lot and the card is read to obtain a key information, which is then stored together with process data in a database. These methods are featured in that they can serve as lot tracking management as well. As a procedure for such a conventional production line management, there can be cited, one as illustrated in FIG. 3. In the conventional example illustrated in FIG. 3, the results of schedule in the form of a schedule table (program) is distributed to a computer, and an operator executes the process in accordance with the work instruction based on the program. Processed records such as the process data are fed back to the scheduler by collection of on-line data in which such data are transmitted directly from the manufacture machines and test machines, respectively, or by off-line input of progress data from a terminal by the operator to control the progress and reflect the progress condition in next scheduling.

Mass production line, in which the same kind of products are manufactured in large amounts, mostly uses, as a manufacturing method, a first-in/first-out (FI/FO) heaping method by which older lots selected from jamming lots that stay in each machine in the line and await for a process are processed in order chronologically with the oldest one being processed at first, or a "kanban" system in which excessiveness or insufficiency of received lots is displayed visually. Results of the processing are given indicating which step in which lot the results are concerned with, in situ with keyboard or bar code reading information, before they can be stored in a data base.

In this case, the work-in-process volume of the lots in the line is controlled. For example, SEMI Technology Symposium 92, p. 129 describes a method in which such a control of work-in-process volume is applied to average process volume in each machine to increase the rotation ratio of lot processing.

This method involves setting up two kinds of limitation values of work volume for each step, one being a limitation value for stopping receipt of lots in the step concerned, and the other a limitation value for restarting the stopped step. When the work volume of the step exceeds the set value, receipt of lots in the step is stopped. When the work volume decreases to below the set up limitation value, receipt of lots is started again. Thus, the work volume is controlled. However, in this case, since it is impossible to grasp process schedules for respective steps in each lot, delivery date management and TAT (turn-around-time, i.e., number of days till completion of the lot) control are difficult.

On the other hand, in a production line called ASIC-LSI (Application Specific Integrated Circuits-LSI), as shown in FIG. 4, there exist many kinds of lots whose priority of process and importance differ from lot to lot. For example, special order products and products of special specifications are small in throughput, and require high designing and production costs, which assigns high importance whereas mass production products such as memories, and general-purpose products are assigned low importance. Among ASIC-LSI, LSIs using full custom cells, or standard cells, are given high importance since specialized mask patterns must be used from the substrate step. In the case of Gate array LSIs, however, common substrates are used, and thus are given low importance originally but high priority is assigned after they enter the wiring step using a specialized mask pattern. On the other hand, the priority of a lot is often changed as a result of monitoring of the allowance in time till the delivery date, and thus varies according as the progress of the processing of the lots. Therefore, the priority of lots changes along with the progress of the processing of the lots.

The time passing from the input of products to their completion, i.e., turn-around-time (TAT), varies depending on the number of lots input in the line. If products of different priorities coexist, those having lower priorities are preceded by those having higher priorities, and process of the lower priority products is deferred. For this reason, mere judgment as to whether or not it will be in time for a delivery date by estimating progress for each lot based on the number of lots worked-in in the machine and process time, as has been conventionally adopted, results in failure of precise estimation of date on which products are completed. Then, in order to control the date of completion of lots having higher priority or importance (hereinafter, referred to as "TAT-controlled lots") so as to be in time for a delivery date, and in addition, to prepare a key information for collecting data, it is necessary to monitor progress of lots, and executing not only a regular or periodic scheduling, e.g., once a day, but also an irregular scheduling to make up difference or gap in progress due to troubles of the machine or delay in progress in order to gradually renew the process schedule. That is, the progress is monitored, the priority as to which lot should be processed first is changed based on the process results thus obtained, and the remaining scheduling other than has already been processed must be executed taking into consideration various factors such as working period of machines (information on disorder, etc.), maintenance conditions, and working conditions of operators. To perform a production management using such a scheduling, all the lots in the line must be divided into steps, judgment must be made as to whether machines (in some instances operators in charge) are available, and a process schedule reflecting priority of each lot must be executed. In particular, in the production of LSIs, many of the steps require continuity with preceding steps (i.e., must be processed within a predetermined time), and hence in order to accurately estimate a delivery date, it is necessary to precisely execute a process start time schedule for each step in each lot with checking which time range is actually available for operation.

However, when it is intended to execute such a process schedule, there exist many combinations of machines and operators and combinations taking continuity with subsequent steps into consideration since there are a plurality of machines of the same kind. Therefore, in a production management system, memory size and calculation time for executing a schedule allocating each step in all the lots while checking working conditions of machines and operators (non-working period range) increases with increased numbers of lots and machines (further including number of operators, if operators are to be taken into consideration), and in particular, use of a large number of lots requires a huge volume of memory and a long calculation time.

SUMMARY OF THE INVENTION

An object of the present invention is to shorten a scheduling time in a production line where there coexist high priority lots or high importance lots that require controlled progress together with lots whose priority and importance each are not so high as compared with others, and thus enabling progress management of a production line and estimation of completion date of high priority lots and/or importance.

Another object of the present invention is to enable progress management of low priority lots.

Further object of the present invention is to enable application to a production line of which number of production lots and number of kinds of products are large.

(1) Therefore, according to a first aspect of the present invention, there is provided a production management system having a scheduler which executes production schedules for a plurality of production machines, forming a production line, and/or articles to be processed which are objects of production processes by the production machines based on first information on production abilities of the machines and second information on state quantity of the articles to be processed by the machines, in which the scheduler comprises: an input means for inputting third information on degrees of production progress on the production machines and/or the articles to be processed; a judgment means for comparing the input third information on the degrees of production progress with the production schedules and for judging if the degrees of production progress are within predetermined allowances on the production machines and/or the articles to be processed; and an adjustment means for adjusting the production schedule so as to match predetermined production target if negative judgment is obtained.

(2) Here, the production management system as described in (1) above may further comprise: a designating means for designating at least one article to be processed having high priority or importance, forming a first article group, from the articles to be processed which are objects of the production processes, the rest forming a second article group, and in which the designated at least one article to be processed is an object of the execution of the production schedules to execute a first production schedule, and of the adjustment.

(3) The product ion management system as described in (1) above may further comprise: a first virtual production lane in which production process of the at least one article to be processed having high priority or importance is performed, and a second virtual lane in which production process of the rest of the articles to be processed in the production line other than the at least one article to be processed having high priority or importance is performed, the first and second virtual lanes being assigned in advance, and in which the adjustment means adjusts the schedules so that distribution ratio of resources relating to the first virtual lane when result of the judgment by the judgment means is negative.

(4) The production management system as described in (2) above may further comprise: an extraction means for extracting marker articles to be processed at a predetermined interval from the second article group, and in which the extracted marker articles to be processed are treated as the articles to be processed in the first article group.

(5) The production management system as described in (2) above may further comprise: a scheduling means for executing a second production schedule for the articles processed in the second article group, the second production schedule being shorter than the first production schedule for the articles to be processed in the first article group.

(6) The production management system as described in (5) above may further comprise: an extraction means for extracting marker articles to be processed at a predetermined interval from the articles to be processed in the second article group, and in which the extracted marker articles to be processed are treated as the articles to be processed in the first article group.

(7) The second production schedule as described in (5) above may include information on completion date of the articles to be processed in the second article group, and the system may further comprise: a priority changing means for checking if the completion date in the information is in time for a predetermined delivery date, and changing priority of the articles to be processed in the second article group so that the articles to be processed in the second article group are treated as the articles to be processed in the first article group.

(8) The production management system as described in (7) above may further comprise: an extraction means for extracting marker articles to be processed at a predetermined interval from the articles to be processed in the second article group, and in which the extracted marker articles to be processed are treated as the articles to be processed in the first article group.

(9) According to a second aspect of the present invention, there is provided a production management method using a scheduler which performs scheduling in order to execute production schedules for a plurality of production machines, forming a production line, and/or articles to be processed which are objects of production processes by the production machines based on first information on production abilities of the machines and second information on state quantity of the articles to be processed by the machines, in which the method comprises the steps of: designating at least one specified article to be processed as object of the scheduling from among the articles to be processed being objects of the production processes and inputting this information; executing production schedules for the at least one designated article to be processed; monitoring production progress of the at least one designated article to be processed based on the executed production schedules; and automatically adjusting the production schedules for the at least one designated article to be processed if the production progress of the at least one designated article to be processed is delayed.

(10) Here, in the production management method as described in (9) above, the at least one specified article may be one member selected from the group consisting of an article to be processed having high importance, an article to be processed having high priority, and a marker article to be processed.

(11) According to a third aspect of the present invention, there is provided a production management method using a scheduler which performs scheduling in order to execute production schedules for a plurality of production machines, forming a production line, and/or articles to be processed which are objects of production processes by the production machines based on first information on production abilities of the machines and second information on state quantity of the articles to be processed by the machines, wherein the method comprises the steps of: designating at least one specified article to be processed as object of long period scheduling from among the articles to be processed being objects of the production processes, and the rest of the articles to be processed being objects of the production processes as object of short period scheduling, and inputting this information; executing long period production schedules and short period production schedules according to kind of the scheduling for the designated articles to be processed; executing a production schedule for whole production system by synthesizing the executed long term production schedules and the executed short period production schedules; monitoring production progress of the at least one specified articles to be processed and the rest of the articles to be processed being objects of production processes, based on the executed production schedule for the whole production system; and adjusting the production schedule for the whole production system with respect to the articles to be processed whose production progresses are delayed, based on results of the monitoring.

(12) Here, in the production management method as described in (11) above, the at least one specified article may be one member selected from the group consisting of an article to be processed having high importance, an article to be processed having high priority, and a marker article to be processed.

(13) According to a fourth aspect of the present invention, there is provided a production management method using a scheduler which performs scheduling in order to execute production schedules for a plurality of production machines, forming a production line, and/or articles to be processed which are objects of production processes by the production machines based on first information on production abilities of the machines and second information on state quantity of the articles to be processed by the machines, wherein the method comprises the steps of: providing a first scheduler which performs a first scheduling, and a second scheduler which performs a second scheduling; the first scheduling comprising the steps of: designating at least one specified article to be processed as object of long period scheduling from among the articles to be processed being objects of the production processes, and inputting this information; executing long period production schedules for the designated at least one specified articles to be processed; monitoring production progresses of the at least one specified articles to be processed, based on the executed long period production schedule; automatically adjusting the long period production schedule with respect to the articles to be processed whose production progresses are delayed, based on results of the monitoring; and transferring the executed or adjusted long period production schedule to the second scheduler; and the second scheduling comprising the step of: executing a short period production schedule for whole articles to be processed being object of production, using the long term production schedules transferred from the first scheduler.

(14) Here, in the production management method as described in (13) above, the at least one specified article may be one member selected from the group consisting of an article to be processed having high importance, an article to be processed having high priority, and a marker article to be processed.

In the first and ninth embodiments of the present invention, objects to be processed which are delayed in production progress are detected, and production schedule is automatically corrected to decrease number of inputting operations by users so that the time necessary for scheduling can be reduced.

In the second embodiment of the present invention, objects to be processed which are to be covered by scheduling are limited to reduce the number of individuals which are objects of scheduling and thus shorten time for scheduling.

In the third embodiment of the present invention, two production pseudo lines are provided, one being a production pseudo line of an object to be processed for performing progress management on a scheduler, and another being a production pseudo line of other objects to be processed for performing progress management on the scheduler, and proportions of allotment of resources, for example, number of operators, number of production machines, etc. are made variable to dissolve delay in progress.

In the fourth embodiment of the present invention, marker objects to be processed are selected are sampled from among objects to be processed which are not covered by scheduling and such sampled objects are subjected to scheduling so that progress of the total objects to be processed but not subjected to scheduling can be inferred.

In the fifth and eleventh embodiment of the present invention, a long period production scheduling is executed for objects to be processed on which progress management is performed while a short period production scheduling is executed for objects to be processed on which no progress management is necessary, thus reducing the amount of information to be scheduled.

In the seventh embodiment of the present invention, progress on objects to be processed having a low priority is also checked by means of a short period production scheduling, and the priority of the objects to be processed which are overdue is deemed higher, thereby reducing delay in progress.

In the thirteenth embodiment of the present invention, a production schedule only for particular objects to be processed having high priorities is executed using a special scheduler, and progress management is carried out independently of a controller which executes a schedule on the whole objects to be processed.

The above and other objects, effects, features and advantages of the present invention will become more apparent from the following description of embodiments thereof taken in conjunction with the accompanying drawings.

BRIEF DESCRIPTION OF THE DRAWINGS

FIG. 2 is a chart showing an example of a process table for fabricating an LSI;

DETAILED DESCRIPTION OF PREFERRED EMBODIMENTS

Figure 1A:
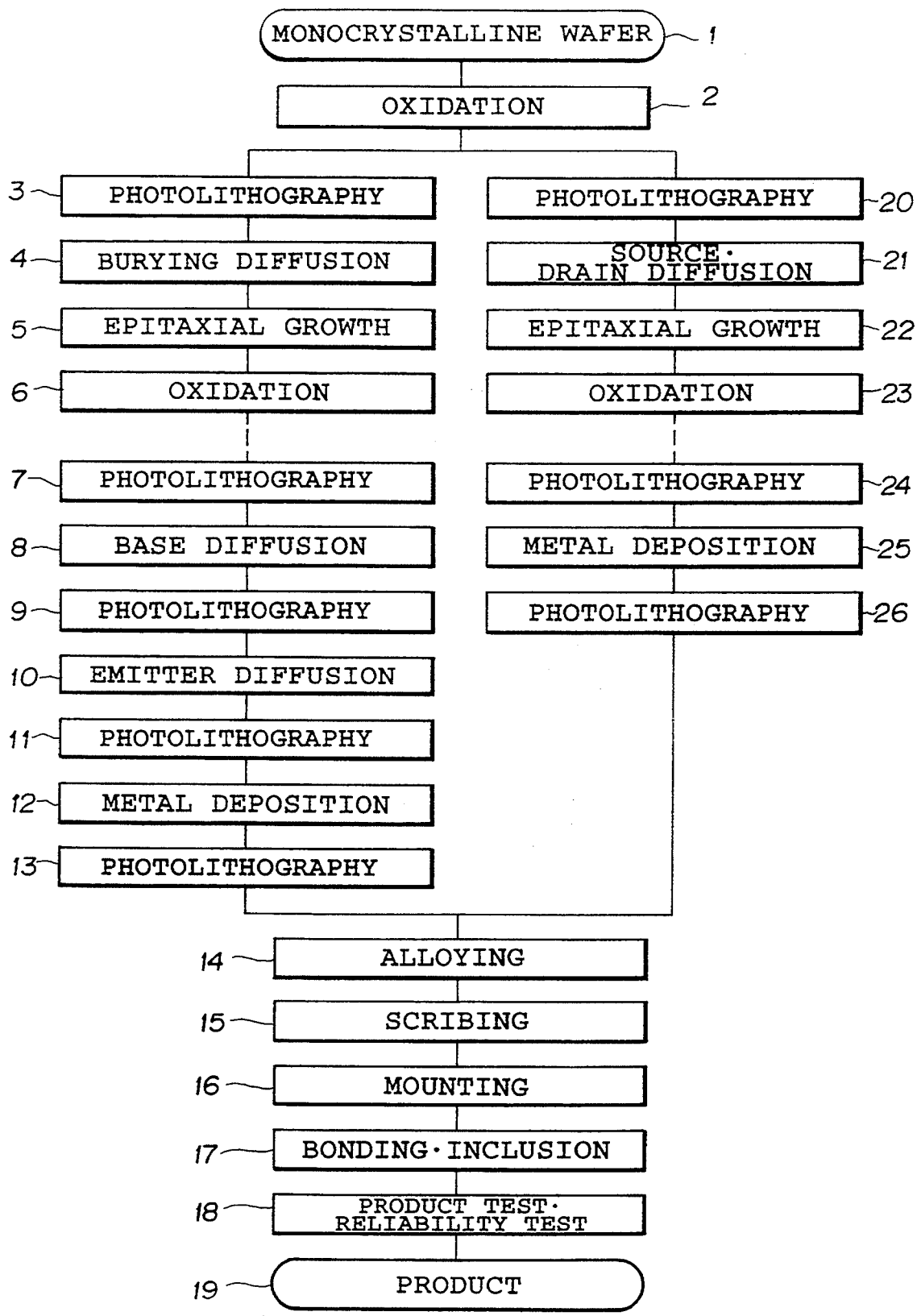
FIG. 1A is a flow chart illustrating a production procedure for an LSI.
Figure 1B:
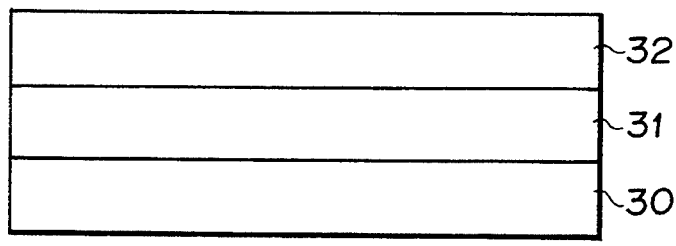
FIG. 1B is a cross sectional view showing a procedure of photolithography shown in FIG. 1A.
Figure 1B:
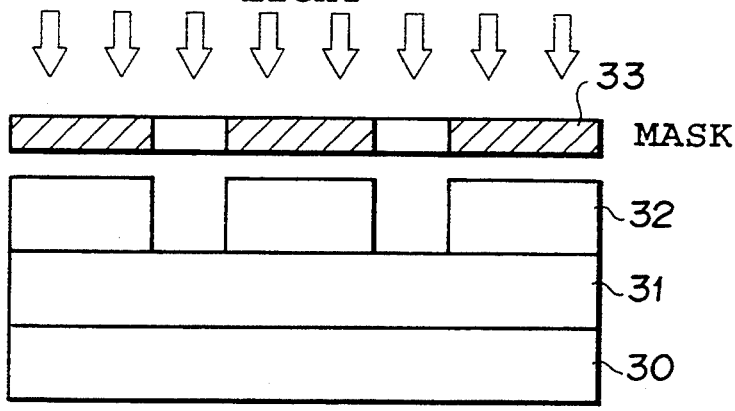
Figure 1B:
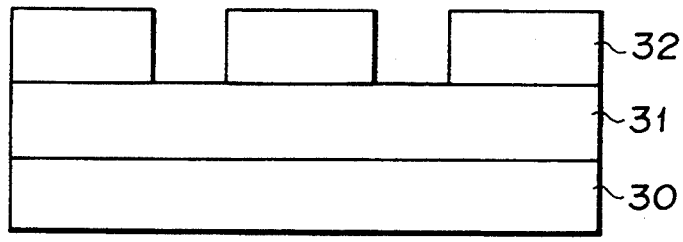
Figure 1B:
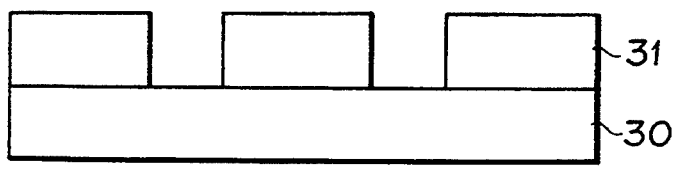

Referring to the drawings, the production management according to the first embodiment of the present invention will be explained. Explanation will be made first on a production line.

Figure 5:
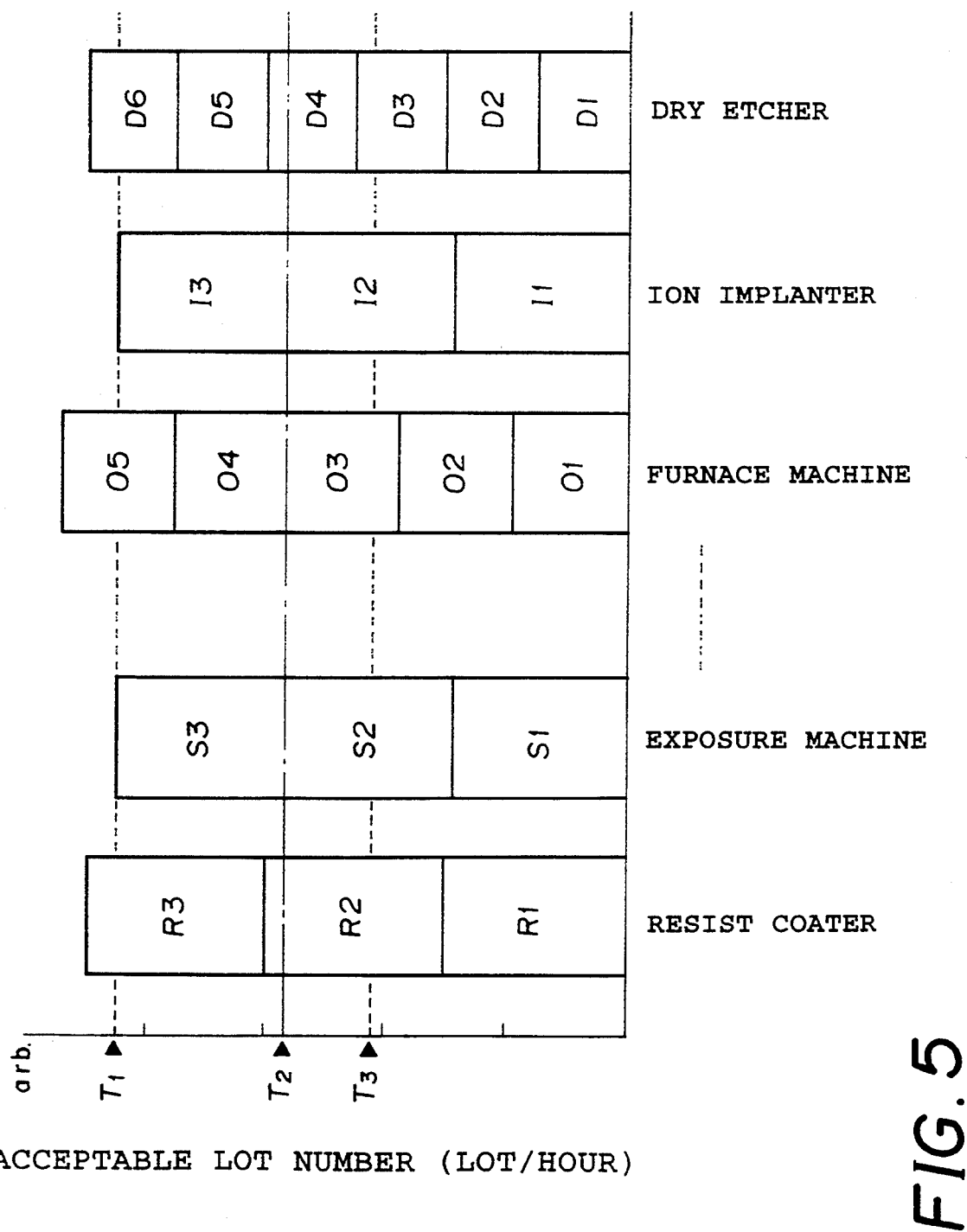
FIG. 5 is a diagram illustrating contents of production according to a first embodiment of the present invention.

Production efficiency (throughput) of a production line depends on how many lots are processed in a unit time per machine, and how many machines are arranged in the production line. FIG. 5 schematically illustrates this condition. More specifically, it is assumed that a production line includes three (3) resist coaters R1, R2, and R3, three (3) exposure machines S1, S2, and S3 for photolithography, five (5) oxidative heat treatment machines O1, O2, O3, O4 and O5, three (3) ion implanters I1, I2, and I3 used for addition and diffusion of impurities, six (6) dry etchers D1, D2, D3, D4, D5 and D6, and T1 is a number of acceptable lots in the production line which number is limited by the throughputs of the exposure machines and the ion implanters, respectively. The operator allots in advance the number of processable lots to a plurality of virtual lines. To simplify explanation, here, the production line is divided into two, one being a virtual lane 2, having a acceptable lot number of T2, and the other a virtual lane 1 having an acceptable lot number of (T1-T2). Needless to say, it is possible without departing from the spirit of the invention to divide the production line into a plurality of lanes having different acceptable lot numbers, respectively, or a plurality of production lines may be combined and form a group of lanes containing a larger number of lanes with difference acceptable lot numbers. It is also possible without departing from the spirit of the present invention to apply the invention to a production line installed in a separate region which is physically isolated without sticking to the expression of "virtual lane".

Next, lot processing in the production line will be explained. When lots are processed using a resist coating machine, an exposure machine for photolithography, an oxidative heat treatment machine, an ion implantation machine, a dry etching machine and so on, in a virtual lane 1, lots in a lot group A (A1, A2, . . . Am, . . . An) are input one by one in a machine 1 in a step 1 (either one of the aforementioned machines, hereinafter the same), a machine 2 in a step 2, . . . , a machine i in a step i, . . . , a machine j in a step j, in accordance with the order prescribed in the process table which defines the procedure of processing, and as a result, the earlier the lot is input, the further the process proceeds, i.e., to step (machines) described in the process table later. Similarly, in a virtual lane 2, lots in a lot group B are input and processed.

Figure 6:
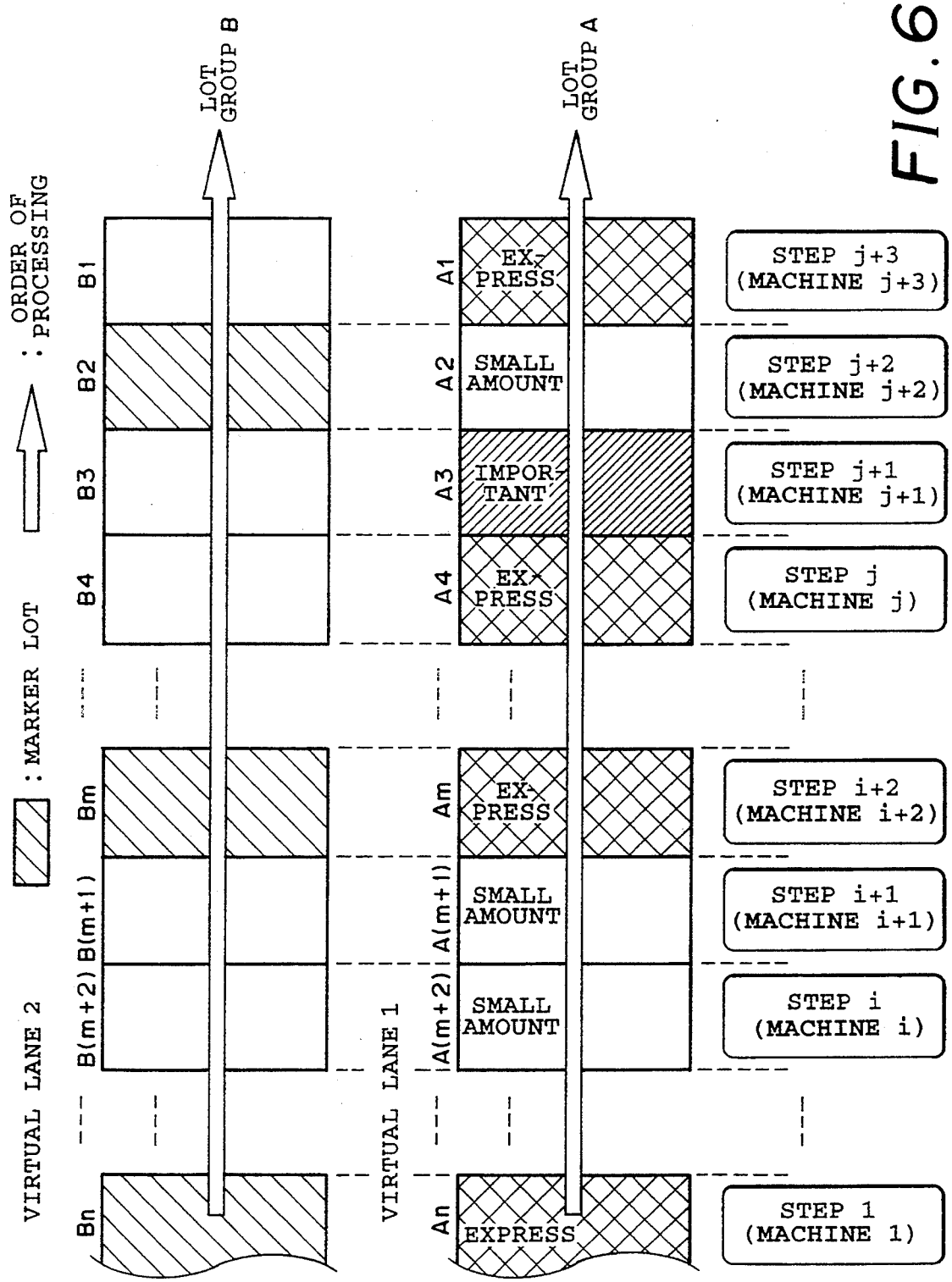
FIG. 6 is a diagram illustrating contents of production according to a first embodiment of the present invention.

FIG. 6 illustrates this situation. Roughly speaking, TAT of the production line is determined by the sum of a time in which each machine processes its objective lot, and a spare time in which lots are awaiting because of unavailability of machines (e.g., during processing other lots, disorder, etc.), and hence a procedure of assigning right machines to right lots without waste of time is important. With respect to this procedure, it is an advantageous feature of the present invention to determine combinations of time for processing, machine to be used, and operator, for only a portion of lots in the production line. Of course, it is necessary to perform a huge amount of calculations of permutation/combination, and it is practical to use a high performance computer (host computing machine) or work stations auxiliary.

Referring to FIG. 6, this effect will be described. In FIG. 6, the lot group A includes high priority lots in the production line, such as those which are required of express commercialization, those which are given much importance from viewpoints of business or investigation and development, those which are produced in small amounts and thus occurrence of faulty is not allowed while the lot group B includes lots which will give rise to similar or identical products, i.e., so-called mass production lots. In this situation, all the lots in the group A are subjected to scheduling in the same manner as the conventional method while in the group B, only selected lots, i.e., those lots belonging to hatched areas as illustrated in FIG. 6, are subjected to scheduling in the same manner as the conventional method. Results of the scheduling are instruction for performing specific processing to the production line, and processing of each lot is planned based thereon. Here, the hatched lots in the group B are defined as "marker" (index) lots and used as an index of progress management of lots. Rules are provided for processing the lots. While many types of ruling have been known, simple, comprehensible examples of such rules are as follows:

(1) In the virtual lane 2, no lot gets ahead of or is left behind of any marker lot in processing of lots;
(2) Upon inputting lots in lanes serial numbers are put to the lots, and the lots are processed in the order of increasing number;
(3) In case where proportion of marker lots to mass production lots is about 1:1, mass production lots are processed in between marker lots since at most one lot, if any, is awaiting for a process before the machine; and so on.

As a result, in the lot group B, lots B1 to Bm to Bn are managed as divided lot groups of B1 and B2 (marker), B3 to Bm (marker), B(m+1) to B(n−1) (marker), and Bn et seq. Group B is for similar or identical lots (products), and there will be no actual harm if progress of processing respective lots in the lots sandwiched by marker lots varies due to increased efficiency as by QC (quality control) activity as described below. Degree of progress of lot processing in the divided groups is almost the same wherever on the process table, and the positions of the respective divided groups can be recognized by a line management post (personnel in charge) or system as the position of each marker lot.

On the other hand, when the proportion of the marker lots in the lot group B is set to 10%, the object of scheduling according to the present invention is the sum of the proportion of the lot group B and that of the lot group A in the production line (e.g., 50%). In the example cited here, the ability of the computer may be 60% as compared when using such a subdivision using marker lots is not used. This is a great advantage of the present invention. In another case, ten production lines are set, one being a production line of a first priority, and the rest nine being production lines in which lots of other priorities are produced. When the proportion of marker lots is set to 10%, management and control of all the lots or the whole system can be performed by the computer whose ability is by only 19% as much as that required when the total number of lots are to be scheduled.

To summarize, the feature of the system management apparatus and process which perform system management according to the present invention is a technology for managing and employing a production line that is a combination of a method of employing a production line and a method of managing resources. The method of employing a production line is a method in which high priority lots and specified lots necessary for the management of the production line are processed by means of a portion of the resources of the production line (number of available machines, number of available operators, total operation hour of the line, etc.) while the rest of the resources are employed to process other lots coexisting in the production line. On the other hand, the method of managing resources is a method in which progress of process in the actual production line reflecting disorder of machines, etc., is monitored and when the progress of high priority lots does not reach a predetermined level, the rest of the resources are redistributed, or proportion of their allotment is changed, dynamically. TAT management by means of dynamic redistribution of resources in the production line can be performed advantageously by automatic scheduler developed by the present inventors. In addition, the rest of the resources to be allotted to the other lots can be used so as to increase efficiency according to quality control activity. The effects of the present invention include one which is obtained by combining the both features consistently.

Figure 7:
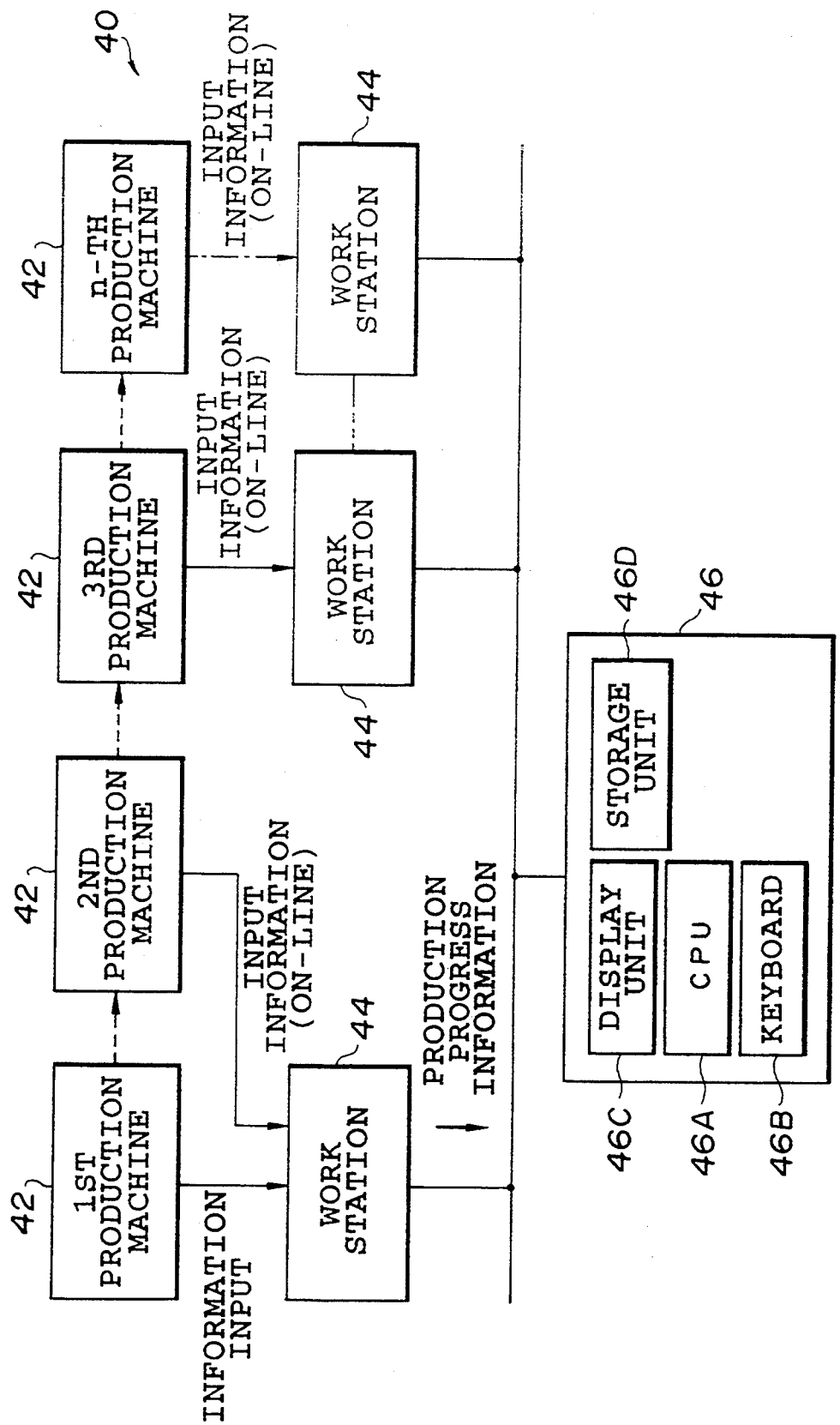
FIG. 7 is a block diagram showing a production management system according to a first embodiment of the present invention.

Referring to FIG. 7, an example will be described in which the aforementioned production management system is applied to a concrete production line to examine if the system is practically efficient.

Production line 40 used for this examination is constituted by a group of production machines 42, i.e., about 50 types of and in total 120 machines, a clean room of 2,500 cm$^2$, in total about 70 personnel (4 teams each including 18 personnel, in three shifts) and so on.

This system has an ability of producing about 1,500 lots a year of about 10 kinds of ASIC-LSIs having a pattern room of 1 $\mu$m (in average 150 lots a year per kind). The production line 40 is controlled by using, as host computing machines 46 serving as a scheduler, two commercially available work stations (ability of computer: 10 MPS) each having installed therein a program for scheduling relative to the present invention (about 100 k steps). The host computing machines 46 each include a CPU 46A, a keyboard 46B, a display unit 46C, and a storage unit 46D.

In addition, about 20 work stations 44 of the same kind, connected to each other in a network as terminals for confirming progress of lots and instruction for processing, are arranged in the clean room including the production line concerned. Information input in each work station 44 for scheduling is on-line or off-line transferred from each production machine 42.

Virtual lanes in the production line may be set up by a method in which lots are divided by machine number or the like index (for example, in FIG. 5, R3 is defined a virtual lane 1, R1 a virtual lane 2, and R2 is for common use), or a method in which lots are divided by the place where the machine is placed (for example, clean room 1 is defined as the virtual lane 1, and clean room 2 as the virtual lane 2). The setting up of virtual lanes may be performed by a further method which will be described below.

More specifically, in the setting up of virtual lanes, the present inventors have tried management and control, giving attention to the fact that the production steps for fabricating LSIs are alternating repetitions of photolithography and other steps.

That is, in a production line in which lot processing is actually performed, an exposure machine S1 is defined as belonging to the virtual lane 1, and machines S2 and S3 are defined as belonging to the virtual lane 2. First, scheduling is performed inclusive of the exposure machine S1 and all the other machines. In the virtual lane 1, the host computing machine 46 performs scheduling in which present positions in the process table of high priority lots are confirmed, and operations of machines and operators are allotted so that degree of tracking necessary for achieving the object can be obtained, and gets results (time during which the line is occupied by machines in the virtual lane 1 on the production line necessary for lot processing, working time during which the personnel are working, etc.: hereinafter, referred to as scheduling results 1).

Figure 3:
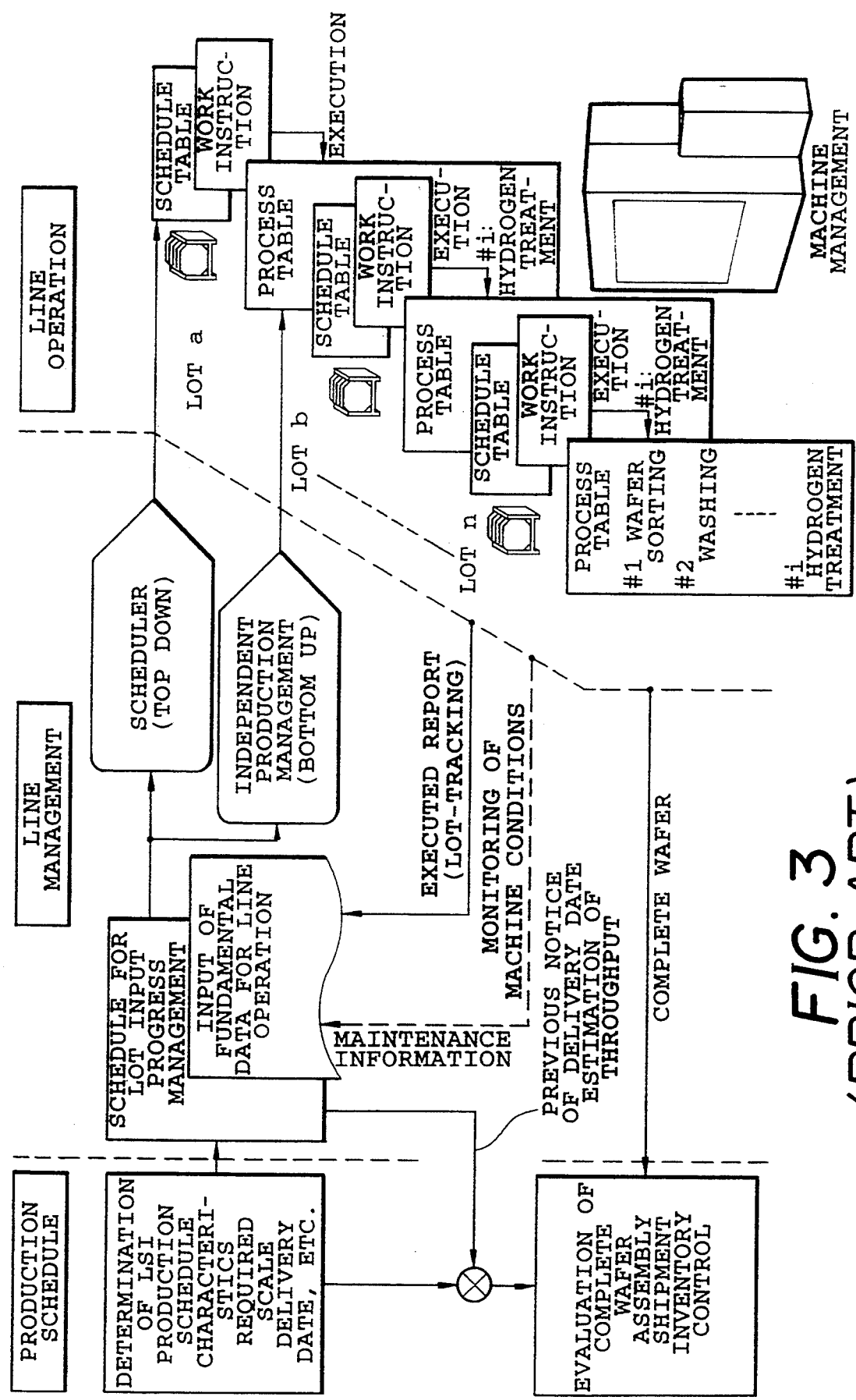
FIG. 3 is a flow chart illustrating a procedure of production line management.
Figure 4:
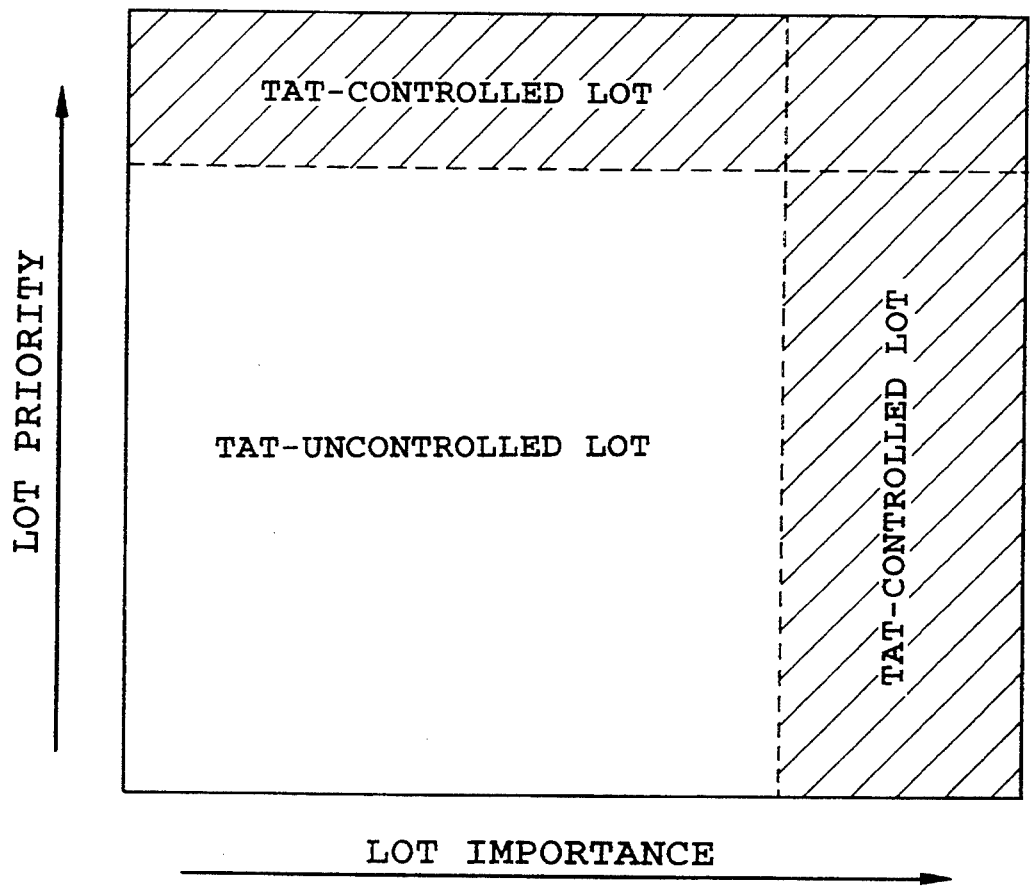
FIG. 4 is a diagram illustrating how to divide progressed lots from non-progressed lots.

The scheduling result 1, or more specifically, the time during which the production line is occupied by the machines in the virtual lane 1 is deemed non-working time for the machines and personnel in the virtual lane 2 (since it has already been decided that the time is used for processing lots running in the virtual lane 1), and this information is added to basic data for scheduling for the virtual lane 2. Then, the host computing machine 46 performs scheduling for only those lots that are treated as marker lots from among mass production low priority lots (i. e., ⅓ of total lots) in the virtual line 2 including the machines on the line and the exposure machine S2 (note that the machine S3 is not included). The results obtained are called scheduling results 2. It should be noted that in this stage, in scheduling results 1 and 2, the ability of the production line is not saturated, or not all the machines and personnel operate. As described above, in the fabrication step for fabricating LSIs, limitation in acceptable lots in the photolithography (i.e., limitation in the number of available exposure machines) results in failure of operation of a next step. In FIG. 5, all the machines on the line each reserve, as a remaining power, room for operation matching the acceptable lot number (=T1-T3) of the exposure machine S3. This remaining power is allotted to operation for processing "lots other than marker lots (hatched)" in the virtual lane 2 as shown in FIG. 3.

Figure 8:
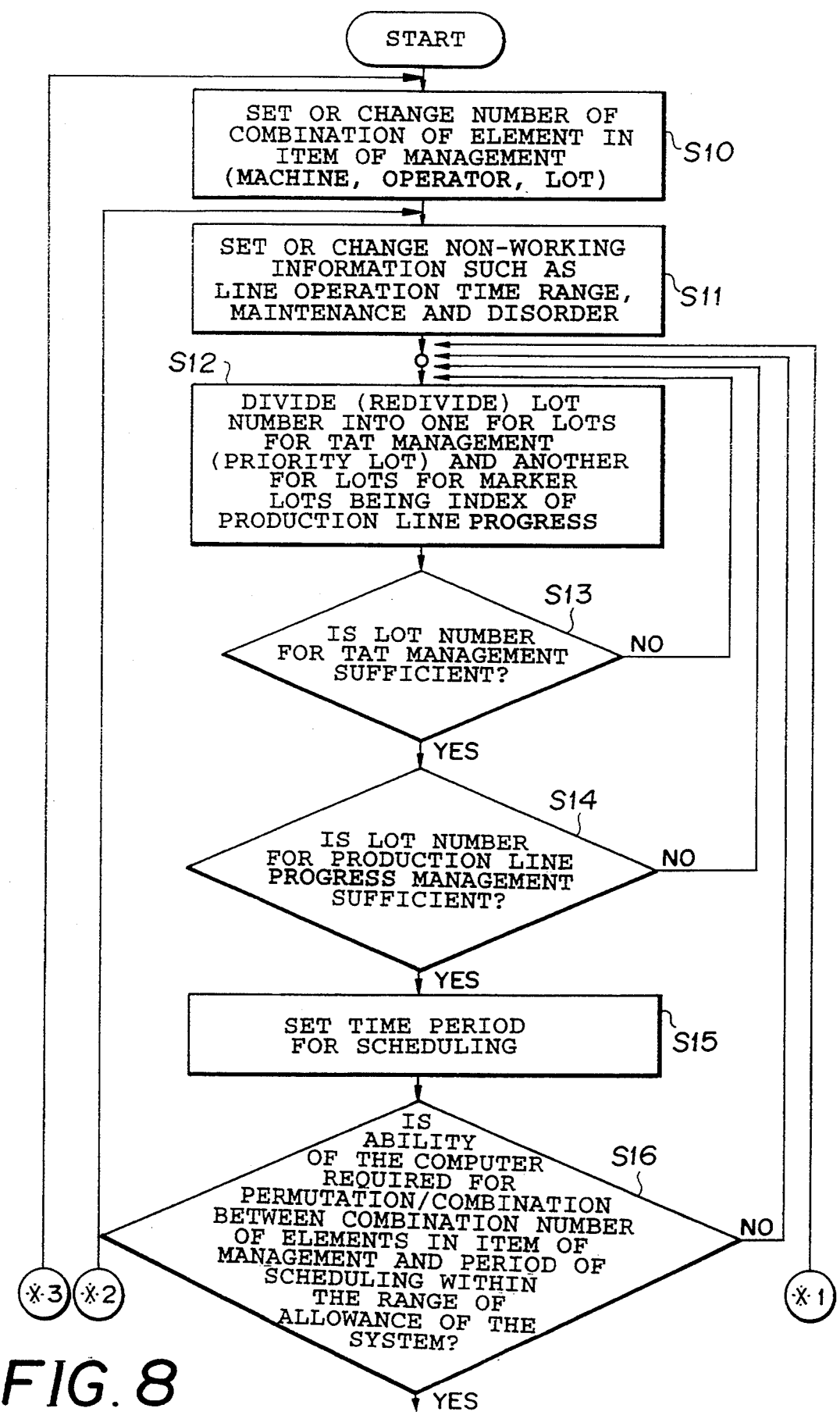
FIG. 8 is a flow chart illustrating a process procedure executed by the host computing machine shown in FIG. 7.
Figure 9:
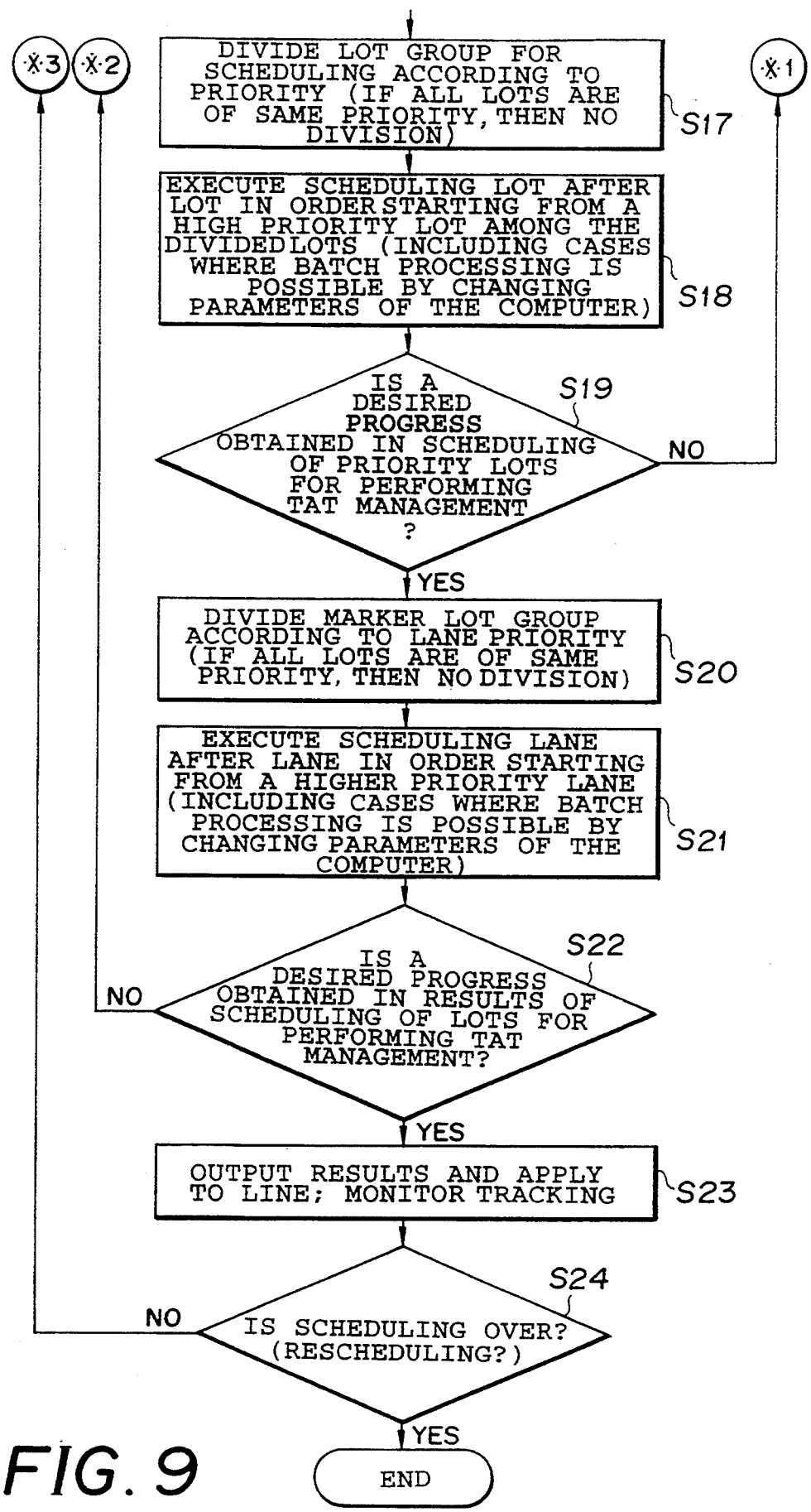
FIG. 9 is a flow chart illustrating a process procedure executed by the host computing machine shown in FIG. 7.

Next, the operation of the system shown in FIG. 7 will be described with further reference to FIGS. 8 and 9, which show the procedure of scheduling executed by the host computing machine 46.

Initial Process

The operator inputs initial data for the whole system through keyboard 46B of the host computing machine 46 (steps S10, S11). As the initial data, there are used the followings. Data on machines:

Kind, number, time range in which operation can be done, names of operators who can operate the machine, processing conditions (first information), names of the production machines for which schedules are executed, and so on;

Data on operators:

Number, time range for operation, and so on; Data on product to be processed:

Process procedures, kinds of production machines used for each process procedure, process conditions, priority conditions, date of starting processing, date of completion scheduled (object of production), amount of input (second information).

Therefore, the keyboard 46B serves as an instruction means.

Figure 10:
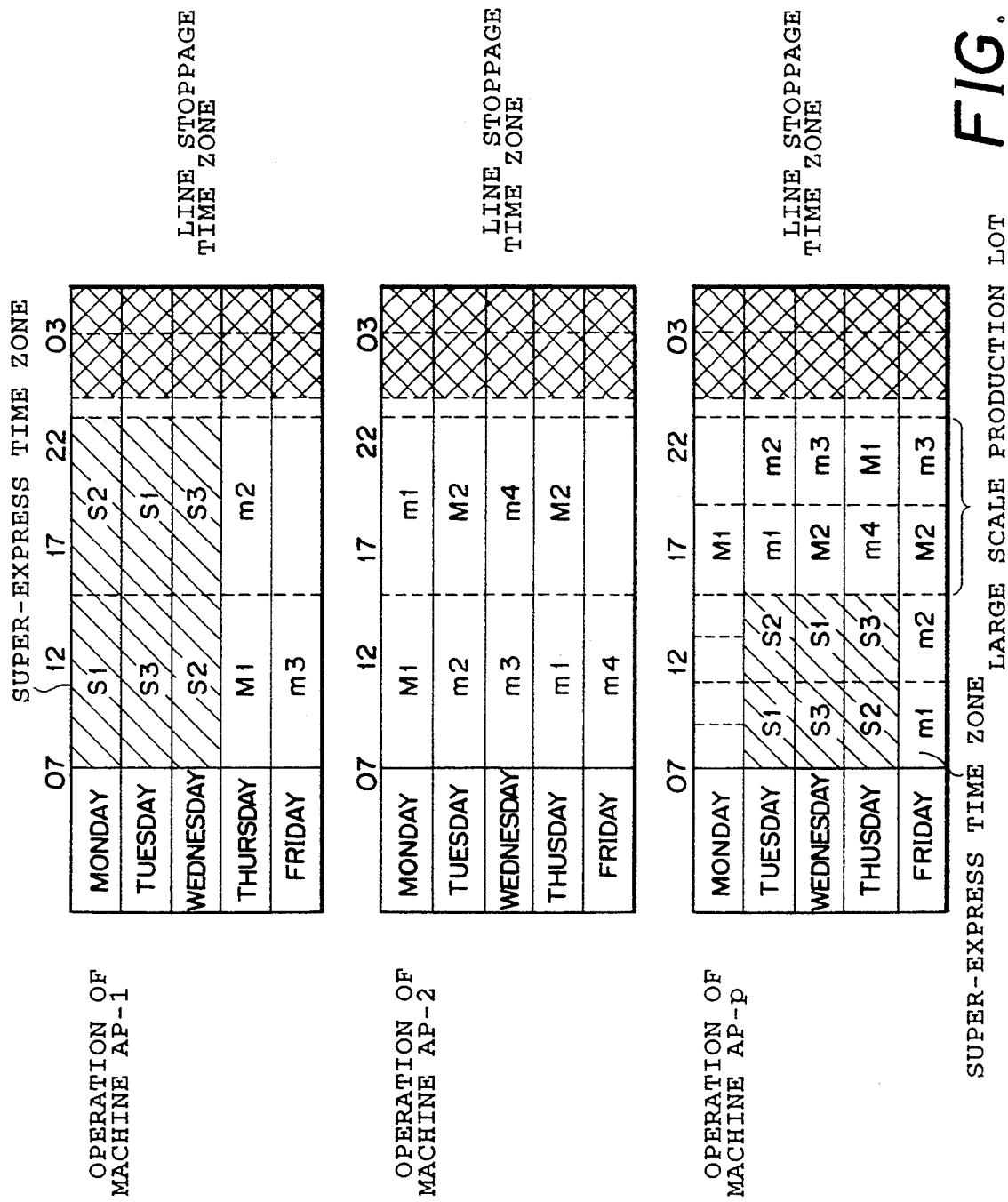
FIG. 10 is a diagram illustrating an example of an executed schedule.

To simplify the explanation, the following assumptions are made. That is, as shown in FIG. 10, there are used three machines, i.e., a pattern forming machine AP-1, a pattern forming machine AP-2, and an LSI processing machine AP-p. Lots of LSI which is a product to be processed include three lots S1, S2 and S3 that are objects of scheduling, and six lots M1, m1, m2, M2, m3, and m4 that are run in large amounts in order to increase production efficiency (here, Mx wherein x is 1 or 2 indicates a marker lot which is an object of scheduling). These LSI lots receive four processes by being run through a pattern forming machine, an LSI processing machine, a pattern forming machine, and an LSI processing machine in order. There are used two pattern forming machines and one LSI processing machine. Thus, each of "the whole operation of the pattern forming machine AP-1 plus the operation of the LSI processing machine from 7:00 to 16:00" and "the whole operation of the pattern forming machine AP-2 plus the operation of the LSI processing machine from 16:00 to 24:00" is deemed as a production line. It is planned to run super-express lots and express lots through the former line, and mass production lots such as marker lots through the latter line. Two operators are attached to each of the three machines, and the machines are operated by them in two shifts, i.e., from 7:00 to 16:00 and from 16:00 to 24:00.

When initial data on the operations of the specified machines are input to the host computing machine 46 through the keyboard (not shown) of one of the work stations or the keyboard 46B of the host computing machine 46, the host computing machine 46 performs scheduling for the designated production machine by the same process procedure as the conventional method. That is, the host computing machine 46 performs allocation of cuts (step S12), confirmation of allocated lot numbers (step S13), and confirmation of marker lot numbers (step S14) in a manner of trial and error (loop processing from the step S12 to S14). Next, upon receipt of input information during the period which is the object of scheduling (step S16), the host computing machine 46 confirms if the ability of computer (host computing machine) necessary for calculating permutation/combination of the combination number of the elements in the item of management and period for scheduling is within the predetermined allowable range (step S16). In case "no" or negative judgment is obtained as a result of this confirmation process, the operation will be backed to the step S12, and allocation of lots will be performed again.

In case "yes" or positive judgment is obtained in this confirmation process, the host computing machine 46 divides the lot group which is the object of scheduling according to their priority. Then, the host computing machine 46 executes scheduling of production, lot after lot, in the order of decreasing priority, starting from the lot having the highest priority (step S18).

Upon setting the initial data no production has started and therefore progress of production of lots is judged to be normal in the confirmation process for the progress in step S19, and the host computing machine 46 executes scheduling for the machines in the lane for producing marker lots in steps S20 and S21.

Thus, after the operation schedules of specified individual production machines have been executed, the host computing machine 46 displays results of scheduling in the display machine 46C as shown in FIG. 10. The results of scheduling are temporarily stored in the storage unit 36D in the host computing machine 46. If desired, the host computing machine 46, upon instruction by the operator, also sends the results of scheduling to one or more terminals (work stations) connected to the machine or machines for which the scheduling has been executed.

Adjustment of Schedule

After a predetermined time, for example, one day from the initiation of production, the host computing machine 46 advances the procedure to step S22 if there is no change in the schedule. Then, information on the progress of lots for which the schedule has been executed one day before, for example, number of produced lots or the like, is input in the host computing machine 46 from production machines 10 corresponding to the lots through the work stations connected to the machines 10, and the host computing machine 46 judges if the progress of production is within the allowable range (in accordance with the schedule). Threshold values used for the judgment are those values obtained by adding an allowance to the results of scheduling stored in the host computing machine 46. When a judgment that the process progress (production progress) is in accordance with the schedule is obtained, the host computing machine 46 will after one day confirm the progress of production for the lot whose machine was the object of scheduling. In this case, the CPU 46A of the host computing machine 46 operates as the judgment means.

On the other hand, when the progress of production is not in accordance with the schedule, the host computing machine 46 receives information for scheduling of lots being processed, e.g., information on process progress, information on kind, etc. of production machines and/or lots, from all the production machines now in operation in the production line through work stations connected to the production machines (step S22 to S11). The work stations operate as the inputting means.

Using the information received and whole machine-related information previously stored in the inner memory machine, the host computing machine 46 executes a schedule for the whole system for normally producing lots on which delay in the process progress has been observed, or a schedule in accordance with the objective of production, and displays the executed schedule on the display machine. Also, the host computing machine 46 renews a part of the executed schedule as a corresponding partial schedule in a newly executed schedule (steps S12 to S21). On this occasion, the CPU 46A in the host computing machine 46 operates as the schedule modifying means.

In the example shown in FIG. 10, when delay in production of super-express lots S1 to S3 by the machine AP-1 is detected by the host computing machine 46, production of a part of the lots S1 to S3, for example, is allocated to the production machine AP-2 of the same kind, and production schedule for the production machine AP-p using the production results of the production machines AP-1 and AP-2 are changed and at the same time the lots S1 to S3 are allocated to a production machine of the same kind as the production machine AP-p.

As the technique for this scheduling, there can be used the following methods.

(1) A conventional schedule program for the whole system and conventional schedule programs for individual machines are used selectively. The schedule programs describe scheduling rules in the form of calculating equation, logical equation or the like. The host computing machine 46 executes a schedule from the input information according to the scheduling rules.

(2) A conventional schedule program for the whole system is used. However, when schedules for individual machines are to be executed, only a schedule for a specified machine is executed while other machines than the specified one are deemed as non-operating in the process by the host computing machine 46 though they are actually operating.

The central processing unit (CPU) 46A of the host computing machine 46 executes such a process to execute or modify schedules for individual machines or a schedule for the whole system. In this case, the CPU 46A operates as the judgment means and schedule adjusting means.

Alteration Of Schedule

Even when the production of lots proceeds normally, often it becomes necessary to alter the schedule before a delay in production is detected by the host computing machine 46 as in the case where troubles occur in the machine. In this case, the operator can instruct the host computing machine 46 to start the control procedure as shown in FIGS. 8 and 9, and execute change in the schedule.

When a production schedule is executed for the machine in which troubles have occurred, use of such a production schedule simplifies inputting operation by users to a considerable extent. In the example shown in FIG. 10, the operator inputs the information on the occurrence of troubles in the machine AP-1, for example, through the keyboard 46B (the inputting means in claim 1). In response thereto, the host computing machine 46 refers to the machine information in the inner memory of the machine 46 to find out a machine of the same kind as the machine AP-1, and select the machine AP-2 as a machine for which a schedule is to be executed. Then, the host computing machine 46 reads out the schedule for the machine AP-1 from the inner memory machine 46D and copies (writes) it in the schedule memory region for the machine AP-2 to execute a schedule for the machine AP-2. The copying process is executed by the CPU 46A in the host computing machine 46.

When it is desired to execute a schedule for the production machine of the same kind as the machine for which a schedule has now been executed and monitor production thereby, the user may input a copy of the executed schedule information and adjustment information to the copy information to the host computing machine 46, and instruct the host computing machine 46 to execute a schedule for a new production machine based on the copy information and the adjustment information. This not only simplifies operation by the user of inputting instruction but also reduces time for scheduling process since the host computing machine 46 does not need to execute a new scheduling process using the program for scheduling as shown in FIG. 9.

A few examples will be described which perform the aforementioned procedure in more sophisticated manner. First, progress of lots in a specified lane in the production line can be recognized by the system by inputting a step which starts/stops the process through a terminal (work station) arranged in the production line. As a method of inputting information on the progress of lots, there can be used a bar code system in which the user scans a wand reader to read a bar code attached to a lot, and clicks a step displayed on a work station using a so-called mouse to input the information. However, the inputting of data in the system may also be performed using a so-called IC card, a magnetic card, or an optical recording card, or a combination thereof which have recorded therein a process table for lot processing. For example, an application is possible in which an IC card having recorded therein the name of lot to which it is to be attached and a process table (usually, referred to as "traveler") moves toward a machine in a state where it is attached to the lot, the management/control system (including a microwave receiving part as a necessary component) of the production line receives a microwave signal transmitted by the IC card, and then instructs start of a predetermined step or judges delay or advancement in the tracking of lot processing and alter the grade of priority of processing in the system, if necessary.

In another example, it is possible to electrically connect a work station mounted on a scheduler which manages and controls the operation of major machines in the production line and the major machines (for example, using an RS232C cable or an Ethernet cable) to construct an integrated system. Actually, this was tried in a production line. In this case, operation data of the machines and tracking conditions of lot processing can be sent from control computers incorporated in the machines directly to the computer for the management and control of the production line through the aforementioned cable. This is advantageous in that most of the data necessary for scheduling can be input in the computer for the management and control of the production line speedily and correctly, which enables next scheduling speedily and correctly.

In case where the progress of lots deviates or has deviated from the original target line, proportions of occupation by machine or personnel among lanes are or will be altered. If processing of lots in a specified lane is delayed, machines and personnel allocated to other lanes are distributed to the specified lane, and on the contrary, if processing of lots in a specified lane advances, the operation of the specified lane is allocated to other lanes. These measures can be achieved with ease by the integrated system including an automatic scheduler embodying the algorithm of the present invention and a traveler.

In the foregoing explanation, LSI production of which the aforementioned technique and systematization have been most improved has been taken as an example. However, the present invention is not limited thereto. For example, it is obvious to one skilled in the art that the program described in the beginning can be applied similarly by replacing the above step by a programming operation by a programmer, LSI processing machine by a computer used in programming, and test by debugging.

On a production line there are a number of lots having different priorities and importances. Therefore, in order to manage progress of these lots and control completion date as described above, it is important to manage progress of lots by a scheduler, estimate their completion date, executing a renewed process schedule by adjusting process such as, for example, increasing the priority if there is a delay in the progress of processing some lots, and run the production line according to the renewed schedule. The estimation of completion date takes a period within the range of usually several months since scheduling should be continued till completion of lots.

Figure 11:
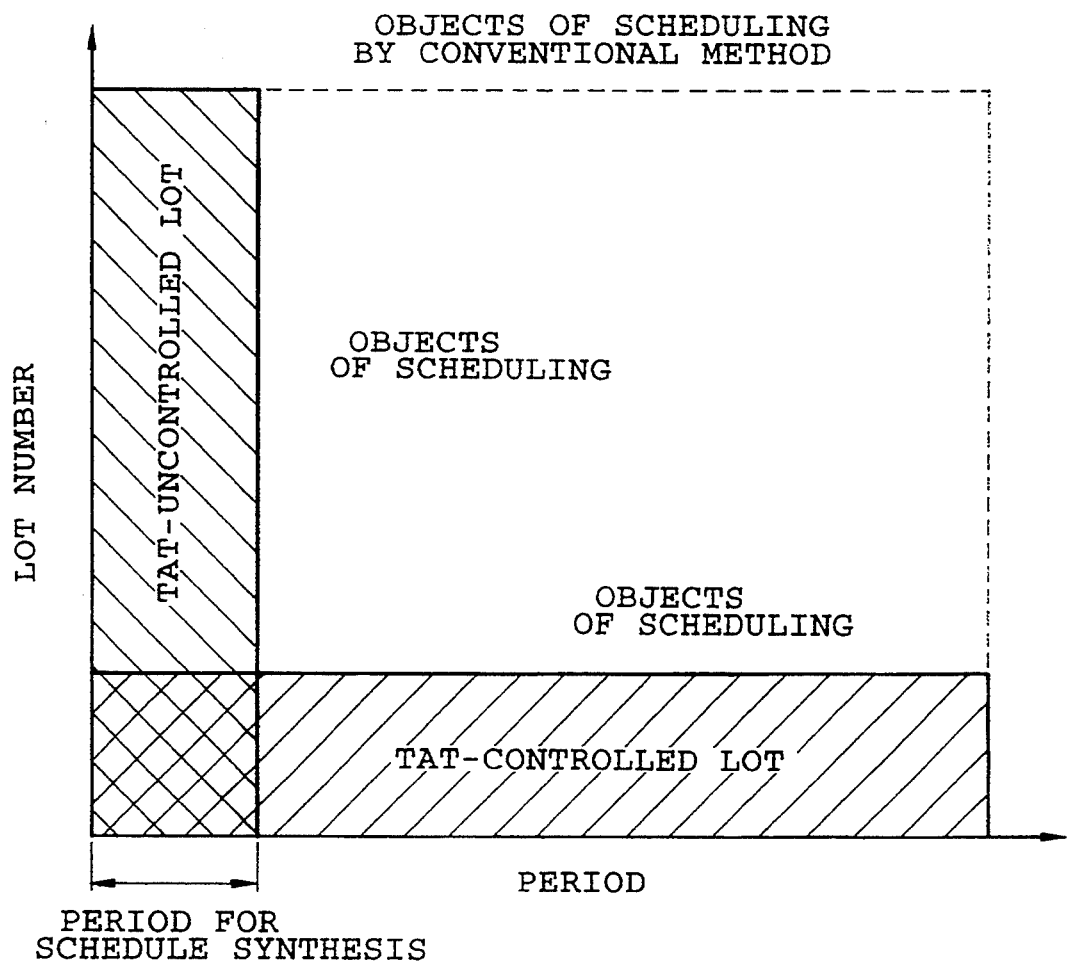
FIG. 11 is a diagram illustrating range of objects subjected to executing a process schedule.

The process schedule is renewed successively in response to progress of processing lots on the production line, the occurrence of troubles in the machines, alteration of production plan, etc. The conventional method must make a process schedule for all the steps for all the lots on the production line simultaneously as in a range indicated by broken line shown in FIG. 11, resulting in that it is substantially impossible to execute a long period process schedule in view of memory size and calculation time available. In contrast thereto, in the present invention, those high priority/importance lots whose progress should be controlled are selected from among the total lots, and long period process schedules for only those selected lots are executed. Then, short period process schedules for a number of lots whose completion date does not have to be controlled precisely such as other gate array substrates. Thereafter, the both long period process schedules and short period process schedules are combined or synthesized by the scheduler. Therefore, memory size and calculation time can be reduced as compared with the simultaneous scheduling, making it possible to perform a longer period scheduling. This allows rescheduling, or an adjustment process such as increasing the priority of lots which it is feared will be overdue with respect to their delivery date, after reviewing the long period schedule once executed. This rescheduling makes it possible to perform precise progress management and delivery date management.

The process schedule includes information on which step in which lot under what process conditions (name of recipe), when process will start, etc., for each step of the process. Process schedule of a lot is executed similarly to the above and a process table is prepared that includes information on which machine, when and under what process conditions the lot is processed is arranged in order. All or a part of the process schedule information is used as key information for storing the process data to a data base. The information used includes, for example, lot name, process table name, machine name, recipe name, etc. Of course, they need not be names but may be numbers. These production management methods may be the same as the conventional method as shown in FIG. 3.

Figure 12:
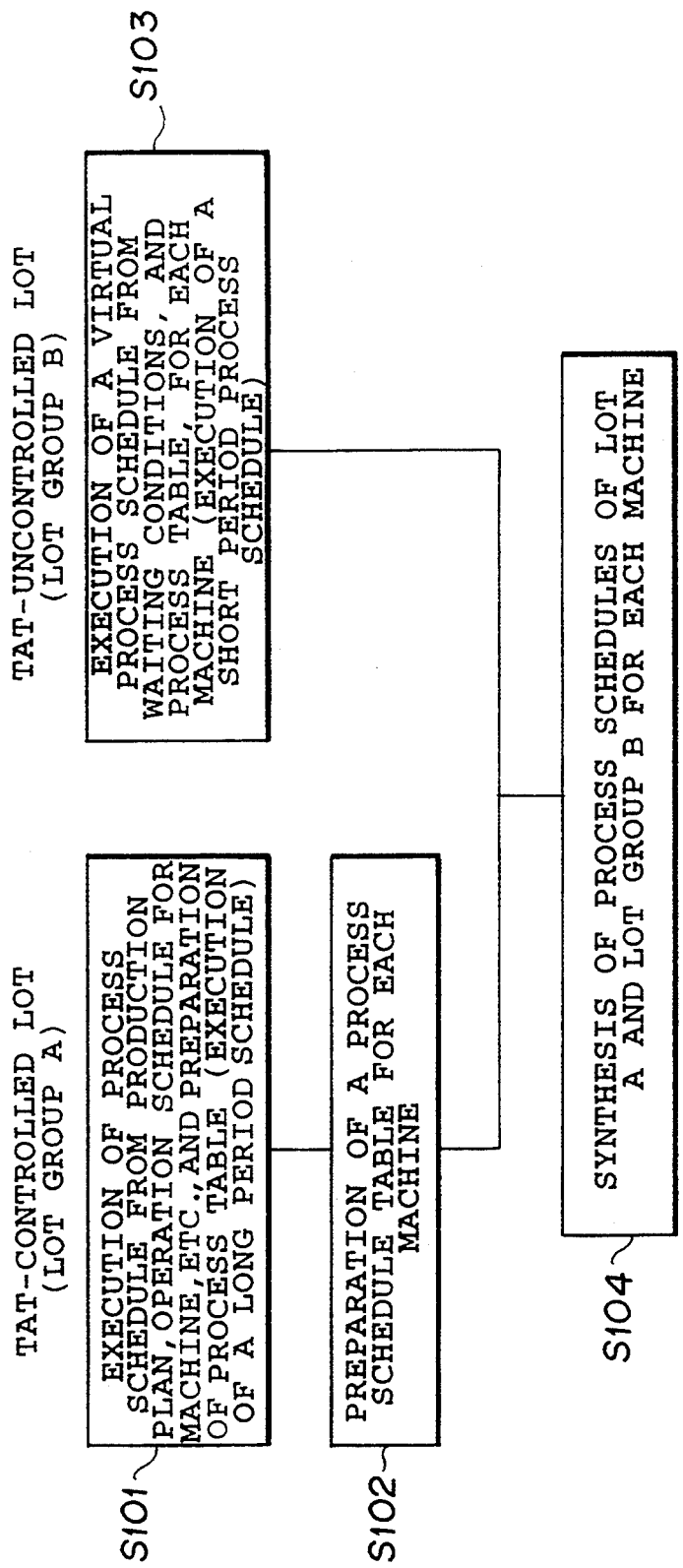
FIG. 12 is a flow chart illustrating other process procedures of the host computing machine shown in FIG. 7 for executing a schedule.

Next, description will be made on long period and short period scheduling with reference to FIG. 12, which is a flow chart for illustrating other process for executing a schedule. A computer (host computing machine 46 in FIG. 7) used as a scheduler executes a software program whose control procedure is shown in FIG. 12 to perform the scheduling of the present invention. The hardware construction of the scheduler may be the system construction shown in FIG. 7, and detailed explanation of the scheduler will be omitted here, with focusing on explanation of the scheduling process of the present invention.

For TAT-controlled lots (lot group A) consisting of high priority/importance lots, scheduling is performed according to the procedure described on the left hand side in FIG. 12. That is, scheduling is performed all over the steps for each lot in step S101 to execute a process schedule for each lot, and processes are run according to the executed schedules, with accurately managing progress of the lots and controlling their completion dates. This scheduling lasts for a period till completion of the lots, usually within the range of several months. The predetermined schedule is monitored by the scheduler and is renewed successively dependent on the progresses, alterations in the production plan due to the occurrence of troubles in the production machines, and so on. After execution of the process schedule in step S101, the process schedules for the respective lots are classified for each production machine (if desired operator) as line resources, and a process schedule table for the machine (operator) is prepared in step S102. On the other hand, a processing/managing method used for TAT-uncontrolled lots (lot group B) having low priority/importance is different from the method used for the lot group A. Usually the lots in the lot group B are produced in large amounts as in the step of processing gate array substrates and hence a large number of lots are present on the production line, resulting in that there is no need for accurately control completion dates of the respective lots, and it is only necessary to know lots to be processed in a short period of at longest from about 1 day to about 1 week. Therefore, a short period process schedule is executed for such lots in step S103. The short period process schedule needs information on only date of processing a lot and priority of the lot, but no need to accurately schedule time in the day. For this reason, the method of executing a process schedule for the TAT-uncontrolled lots may be simplified as compared with the method used for the TAT-controlled lots. This simplified method will be explained later on.

As described above, the scheduler classifies process schedules executed separately by machine, or by process date, and synthesize them in step S104 to execute a process schedule for the whole production line. According to this process procedure, even when a schedule to be executed is a short period process schedule, a schedule for TAT-controlled lots should be based on a long period plan, and hence the process procedure is controlled so that completion date of each target lot can be in time with the delivery date. In addition, process schedules for other mass production lots are executed simultaneously. Preparation of such schedules can be done with reduction in the memory size and calculation time of the scheduler.

Figure 13A:
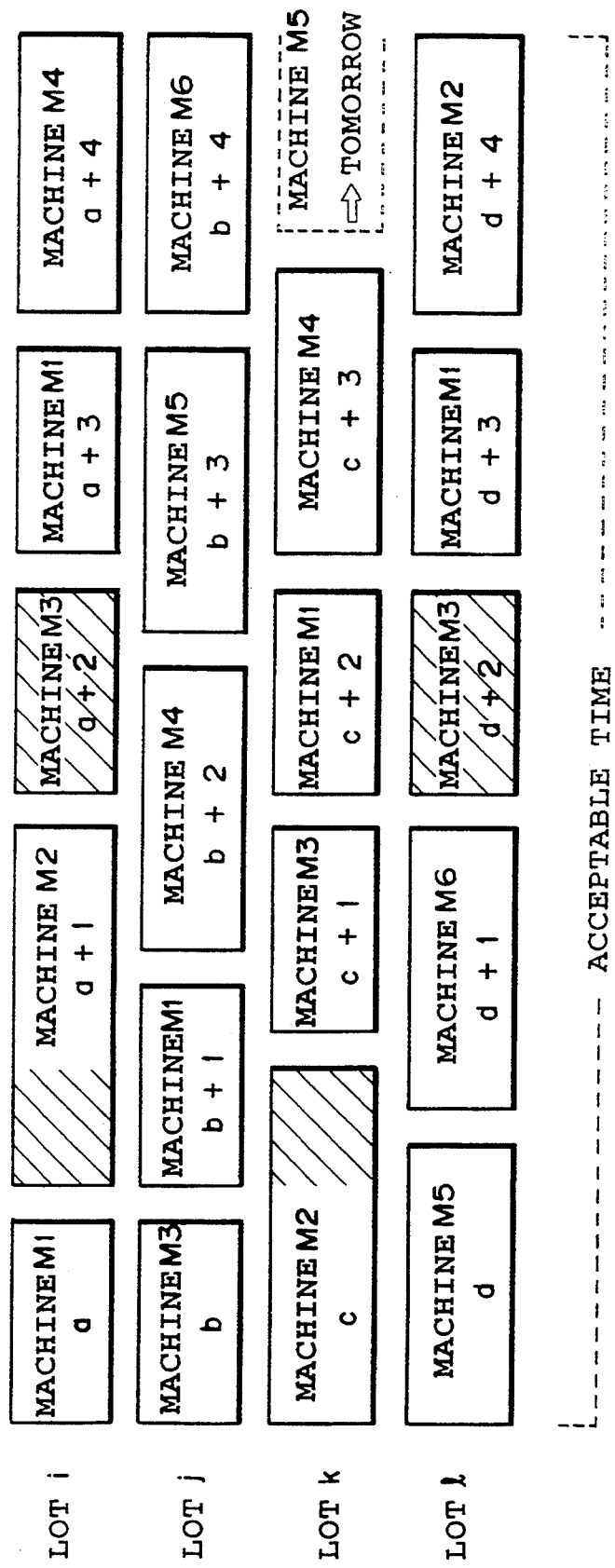
FIGS. 13A to 13D are diagrams, respectively, illustrating contents of scheduled process for TAT-controlled lots.
Figure 13B:
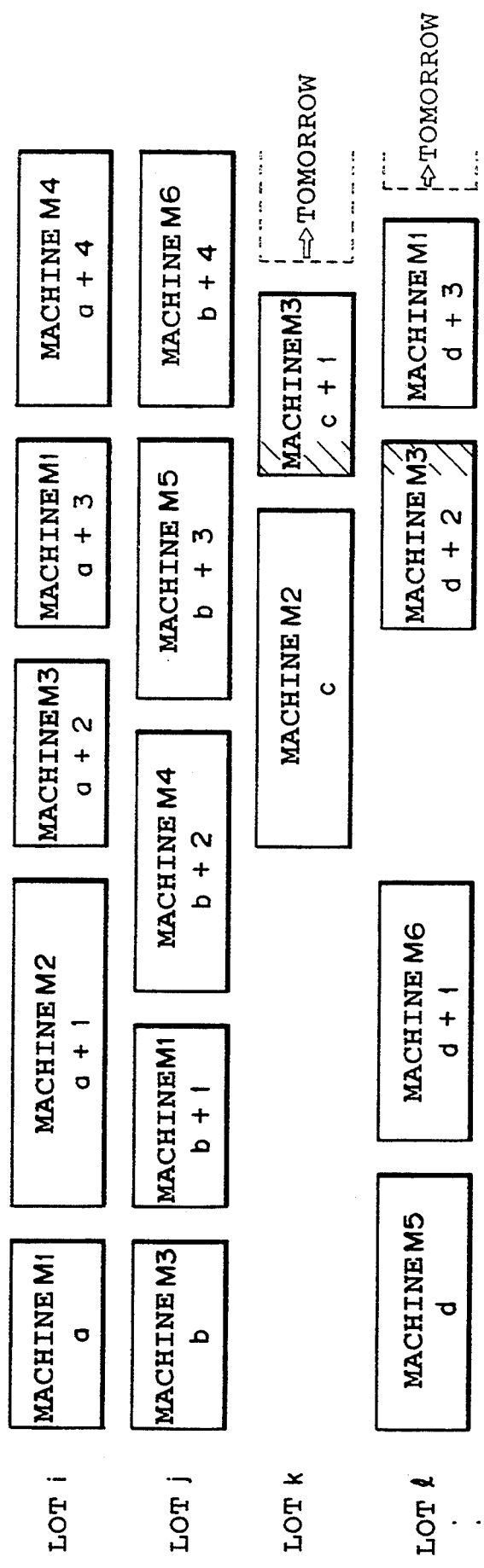
Figure 13C:
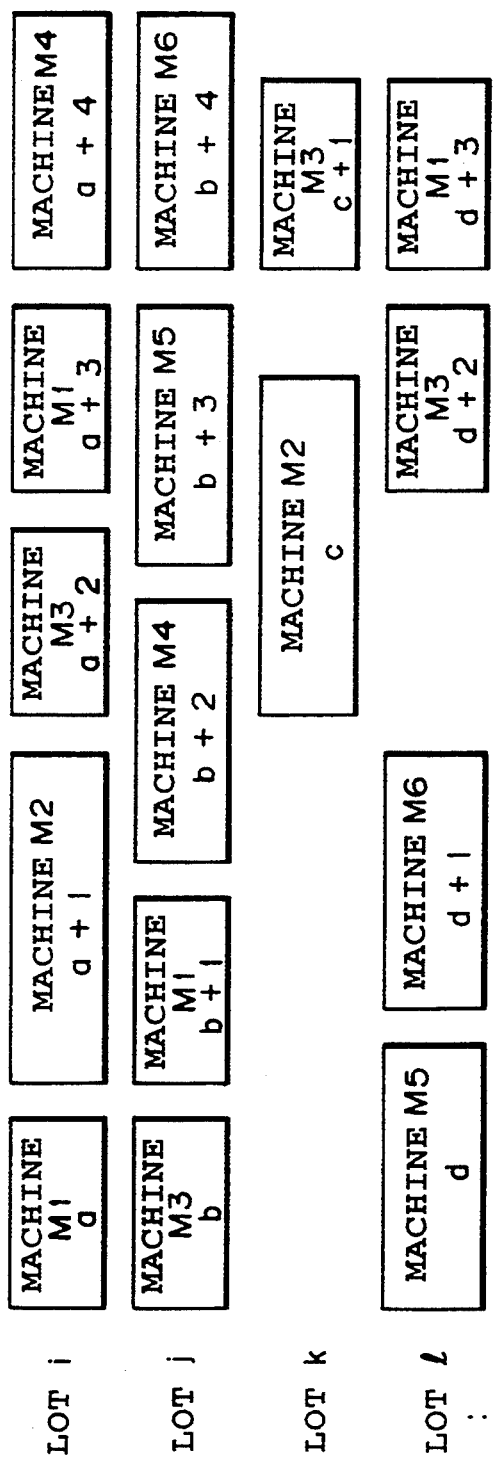
Figure 13D:
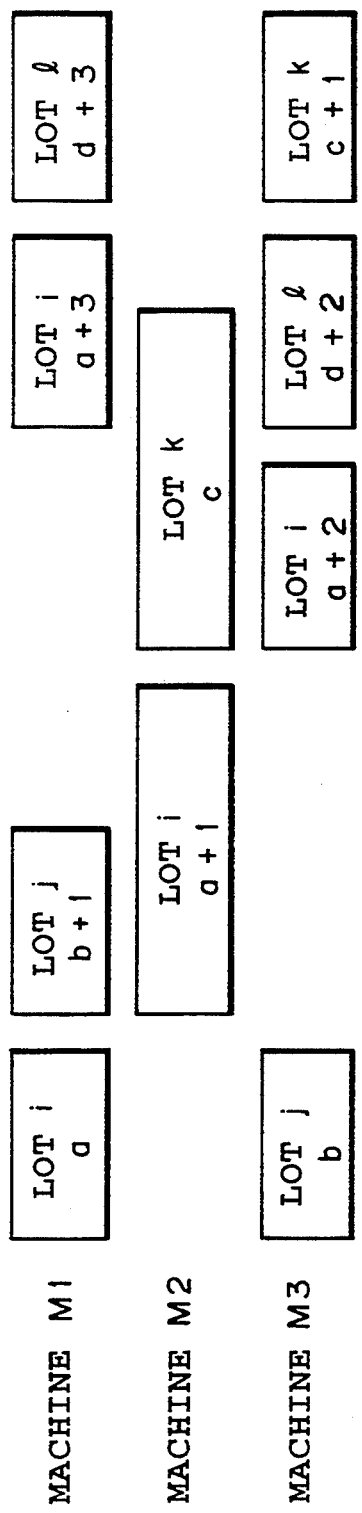

The scheduler first executes process schedules (important process schedules) for TAT-controlled lots (process S101 in FIG. 12). This portion is in most cases one severalth since lots are selected and there occurs no awaiting in machines. It is simple to execute a schedule centered on a process schedule for each lot. FIGS. 13A to 13D illustrate an outline of such a preparation process for TAT-controlled lots. For simplicity's sake, a smaller number of steps which can be processed in a day is shown in FIGS. 13A to 13D. In the case of 24 hour operation, operation time range is disregarded. First, the scheduler recognizes process steps (a, b, c, d, ...) to be started now in the TAT-controlled lots i, j, k, l, ... Then, referring to process tables of respective lots, the subsequent steps are arranged in order in the operation time ranges of the machines to execute a temporary schedule as shown in FIG. 13A. Since the temporary schedule does not take overlap with other lots in consideration, processing of one lot actually does overlap with the processing of other lots as the hatched portions (machines M2, M3) in FIG. 13A, i.e., and the schedule involves steps which cannot be processed. If there is an overlap, the process schedule of lots having lower grades of priority are shifted backward (postponed) as shown in FIG. 13B. For cases where the lots have the same grades of priority, a rule for precedence is set up in advance such that an earlier input lot must take precedence (first-in first-out), or a lot in a more advanced stage must take precedence. However, if the step or steps are shifted backward as shown in FIG. 13B, now another overlap (machine M2) in a different time range could occur. If such an overlap does actually occur, one of the process schedules for the overlapping lots is shifted. When process time is to be shifted, this should be done so that the influence can be as less as possible. If the overlap is small, later input step will be shifted backward (postponed). It is preferred that the once shifted lot be treated as if its grade of priority was increased, which avoids that only particular lots are shifted exclusively. In FIGS. 13A to 13D, there are spaces between adjacent steps, which spaces correspond to transfer times during which lots are transferred between the adjacent steps. By arranging process schedules for all the steps in each lot (or arranging process schedules during a designated period), a process schedule is executed as shown in FIG. 13C. In the case of production lines other than 24 hour full operation line, if shift of process time results in that the process time is outside the operation time range within the same day, an adjustment process is performed to postpone the process to the next day. When process schedules for lots are executed in the scheduler, they are classified machine by machine and process schedules as shown in FIG. 13D are executed (step S102 in FIG. 12). The schedules are for only the TAT-controlled lots and have some spaces or room.

Figure 14:
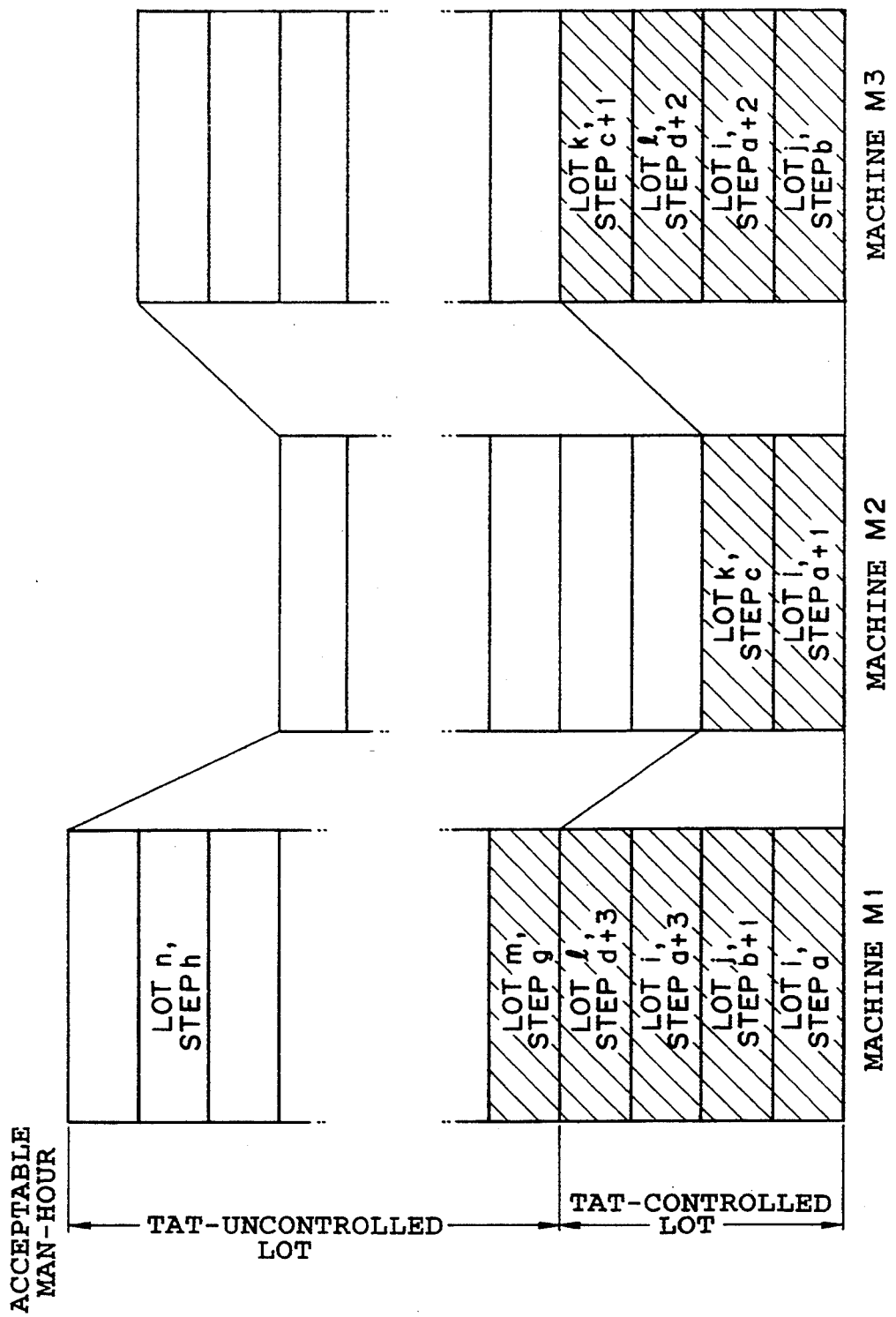
FIG. 14 is a diagram illustrating contents of prearranged process for TAT-uncontrolled lots.

While the process schedules have been illustrated as diagrams in FIGS. 13A to 13D, they may be expressed machine by machine as a list in the form of a process schedule table as shown in FIG. 14.

On the other hand, TAT-uncontrolled low priority lots and importance may be scheduled in the same manner as the TAT-controlled lots. The following method can be used for executing such a process schedule.

(1) Process schedules for TAT-controlled lots are executed by using a scheduler, and process schedules are allocated with deeming the working time for the TAT-controlled lots as the non-working time and the rest time as non-working time of the machine.

(2) Installment of the production line and process time range are divided in advance into two portions, one for TAT-controlled lots and the other for TAT-uncontrolled lots, and scheduling is performed by a scheduler for only the portion for the TAT-uncontrolled lots. For example, when there are a plurality of machines of the same kind, the process schedules are allocated to two portions, that is, one or two of the machines being used exclusively for TAT-controlled lots, and the rest for TAT-uncontrolled lots. This distribution may be disregarded and the processes by the machines may be treated as identical. In this case, machines which are scheduled to be used are replaced by those which actually performed the processes when data are stored.

As the method of executing process schedules for TAT-uncontrolled lots in a simpler manner, there can be used a method in which progress of lots is inferred from average process time, and/or waiting time. This method will be explained below referring to FIG. 14. In the same manner as shown in FIG. 13A, steps subsequent to the present process step are simply arranged in chronological order, and a corresponding order number of process schedule is assigned to each machine. On the other hand, the number of steps which can be processed in a day by a machine (acceptable step number) is separately calculated. The machines are allocated to the same number of steps as the calculated acceptable step number are to be processed in the order of increasing order number described above, and the allocation is registered in a process schedule table for each machine (FIG. 14). Any box in each table indicate that processing of a certain step in a certain lot is allocated. While FIG. 14 describes only lots and steps, it is convenient for synthesizing a next process schedule to store in the table process time, priority, startable time (intended completion time of prior step), and pointer to a next step as well. From this table, lots to be processed on a certain day can be inferred. As shown in FIG. 14, registration of TAT-controlled lot portion in advance, i.e., selection of TAT-uncontrolled lot portion, can reduce the amount of corrections which would be required upon synthesis of the process schedule described later on.

Figure 15:
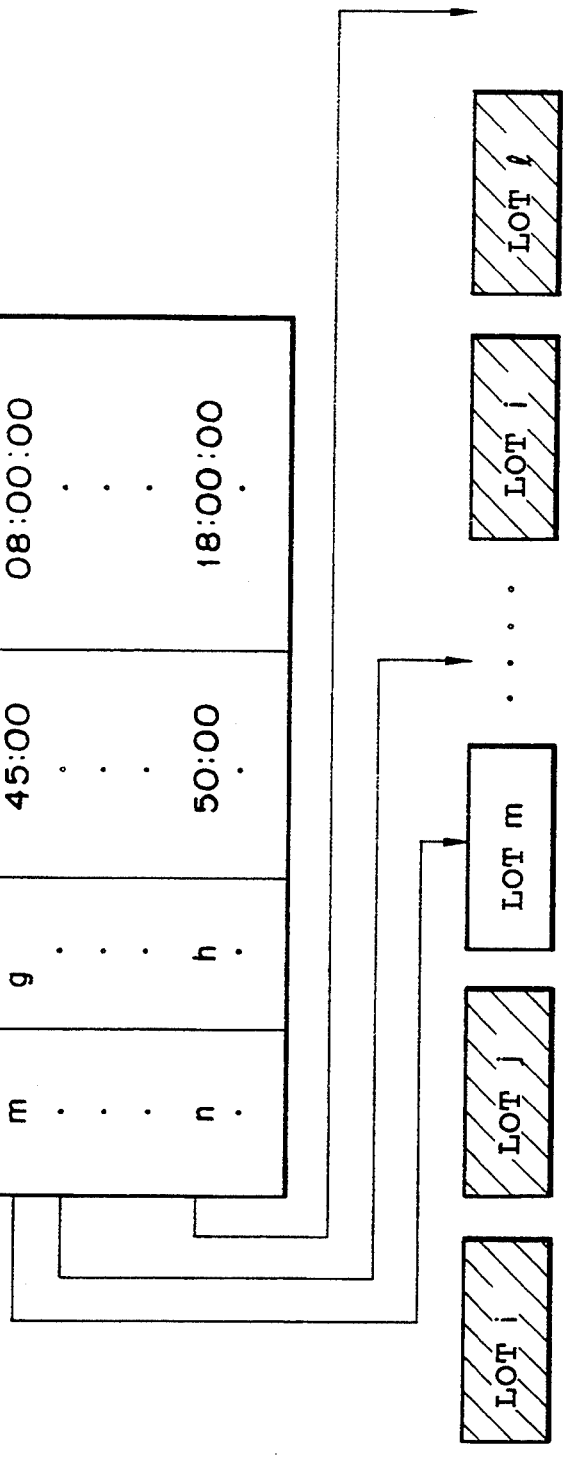
FIG. 15 is a diagram illustrating a combination method for combining a process schedule for TAT-controlled lots with a schedule for TAT-uncontrolled lots.

Referring to FIG. 15, explanation will be made on the method of synthesizing process schedules (step S104 in FIG. 10) for the lot group A, i.e., TAT-controlled objects, and the lot group B, i.e., TAT-uncontrolled objects, by the scheduler. The synthesis of the process schedules is performed for each machine. A process schedule table for a machine is prepared. This table contains lots in each process step, steps, process time, and processing startable time. Lots having higher priorities are indicated at higher positions, and for lots having the same priority, those having earlier process schedule times are indicated at higher positions. Higher ones take precedence in the allocation of process schedule. The synthesis is performed by simply connecting results of separate scheduling for TAT-controlled lots and TAT-uncontrolled lots to form a table. Alternatively, the results may be in the form of separate tables. The startable time in FIG. 15 is the sum of an intended completion time of a prior step and a phase time. To synthesize, first lots having higher priorities (TAT-controlled lot portion) are allocated using the process schedule times first executed. For the TAT-uncontrolled lot portion, reference is made to process startable time and judgment is made as to whether there is a spare time within the range of process time after the process startable time, and the lots are allocated to vacant places in the table. This procedure is practiced for other steps. Those steps which are not acceptable are postponed to next day. In this synthesis process, the original process startable time deviates from the actual process schedule time. Therefore, a pointer to a next step is provided for each step in the process schedule table of a machine so that it can be recognized which step in which machine is the next step to be processed, and once a process schedule is decided, the scheduled time is reflected to the process startable time in the next step (this being practiced in the same manner in subsequent steps), thus enabling execution of accurate process schedules. This synthesis method, which executes process schedules for only specified machines, enables further reduction in memory size used upon executing process schedules as compared with the method shown in FIGS. 13A to 13D in which all the lots and all the steps are treated simultaneously.

Since the aforementioned method inserts process schedules for TAT-uncontrolled lots in spaces remaining after the process schedules of TAT-controlled lots have been fixed, it is sometimes difficult for steps to be allocated if the spare time is insufficient. To improve this, a method may be used in which the total of transferable time for each process step in the priority lot portion is input in the table as well, and process schedules of TAT-controlled lots are shifted backward within that time range to produce spare times, during which processing of TAT-uncontrolled lot portion is allocated. For example, when process schedule t for a TAT-controlled lot is allocated in the time range of from 11:00 to 13:00, it is possible in some cases to shift a subsequent process if such process is scheduled to be completed in 2 hours. On the other hand, when it is intended to insert process schedule u for a TAT-uncontrolled lot requiring 2 hours in a time range starting from 10:00, the process schedule t competes and the process schedule u cannot be allocated. However, if the process schedule t is postponed by 1 hour, the process schedule u can be allocated in the time range of from 10:00 to 12:00. As described above, the use of transferable time increases the efficiency of scheduling.

Here, the order of machines for which process schedules are executed is not critical. However, it is more efficient to treat first a machine in which more lots are staying. Strictly, when a certain step is shifted backward, it is necessary to shift backward each of subsequent steps similarly and execute process schedules for respective machines in order since the line is run machine after machine. In this case, if some of the machines have already process schedules, they need be reallocated. However, in the case of a mass production line where there are many lots staying in the line and lots are awaiting a process in each machine, next step is in a stand-by condition and hence the shift of the subsequent steps gives substantially no influence on the efficiency of the line. Therefore, it is advantageous to execute process schedules on respective machines for each short period processing unit time (for example, for 1 day or so in the case of LSI fabrication step of which process time is over the range of from several tens minutes to several hours; for 1 hour or so in the case of a step in which one process is done within 1 minute; and so on) independently of others in parallel, and then shift the process startable time of the next step based on the results to execute a process schedule for the next processing unit time. Thus, the volume of process schedule executed at a time is limited to that on a certain machine for a short period, and this procedure is repeated in order, resulting in that the memory size to be used at a time may be very small. Also, it is possible to perform parallel processing in calculation, which leads to reduction in process time.

According to the method of scheduling as shown in FIG. 12, TAT-controlled lots have only short period process schedules and thus it is impossible to prepare a production plan or perform progress management and delivery date control based on a long period schedule. To overcome this defect and make it possible to perform rough progress management and delivery date control with reducing the time required for scheduling and the size of memory to be used, a marker lot method can be used. More specifically, in the case of a production line in which there are a large number of lots of the same kind, such as that for producing gate array substrates, one lot for every N lots (e.g., 10 lots) is selected as a marker lot and treated in the same manner as TAT-controlled lots in the execution of a long period process schedule. The priority of the marker lot is maintained low. Upon execution of such a process schedule, timing of inputting lots, or step with which the process is to be started (first step) on the day of processing may be designated (or completed step at a predetermined time may be noticed) so that process schedules well matching to processes on actual production line can be obtained and progress of lots on the production line can be managed efficiently. On the other hand, lots other than the marker lots are treated as TAT-uncontrolled lots and only short period process schedules are executed therefor. If rules are established in advance that lots shall be processed in the order of input, and that when a plurality of lots are staying and awaiting a process in the same step, an earlier input lot takes precedence in processing, then (N−1) non-marker lots sandwiched by the two marker lots can be managed by the rough lot progress management described above. Data collection for the marker lots can be processed in the same manner as in the case of lots for which ordinary scheduling is performed.

In the production management method described above, correction or adjustment of the process schedule for the whole production line, if desired or necessary, can be performed by the following steps. First, long period (for TAT-controlled lots) and/or short period process schedules are adjusted or corrected (or newly executed) in the scheduler, and the process schedules are synthesized with the unadjusted process schedules stored in the scheduler to execute a fresh process schedule for the whole production line. Lot-tracking can be monitored by the scheduler as has been done conventionally, and when the scheduler detects that predetermined extraordinary or abnormal conditions are met, adjustment or correction of can be performed.

In particular, when delivery date of TAT-uncontrolled lots is close at hand, TAT-uncontrolled lots are deemed as TAT-controlled lots and a fresh process schedule for the whole production line is executed. This makes it possible to accelerate progress of lots of which delivery is to be pushed. This process corresponds to change of priority.

Figure 16:
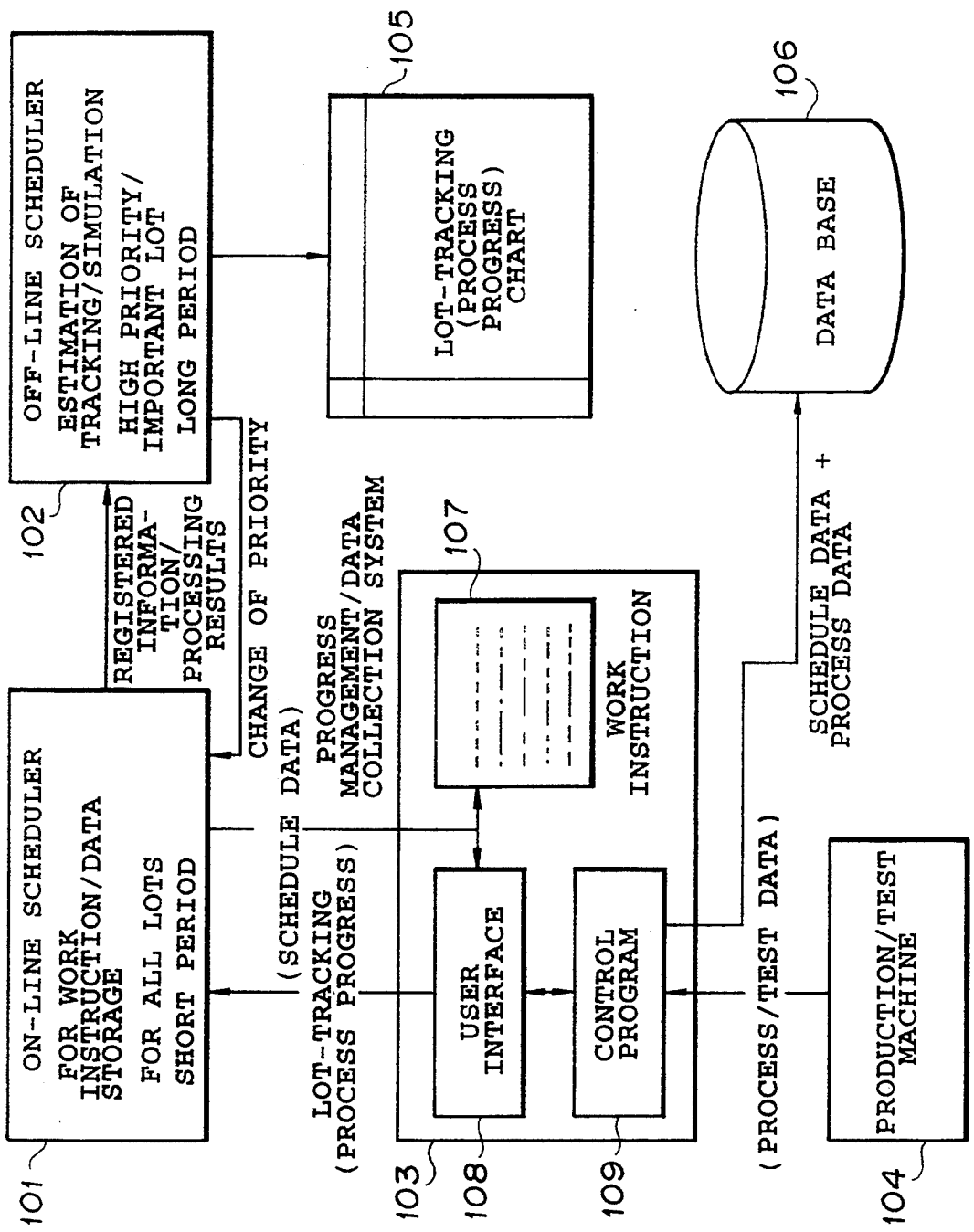
FIG. 16 is a block diagram showing a construction of a production management system according to a second embodiment of the present invention.

Now, explanation will be made on the second embodiment of the present invention in which the scheduling is executed using two schedulers. FIG. 16 shows a basic construction of the production management system of the present invention. In this system, two schedulers using work stations are employed. One is an on-line scheduler 101 directly connected to a tracking management/data collection system 103 (a second scheduler) in the production line, and the other is an off-line scheduler 102 which estimates completion dates (a first scheduler).

The on-line scheduler 101 not only issues work instruction (transmittance of schedule information) and performs lot-tracking management, but also executes a short period process schedule for work instruction to each terminal in the production line based on the results of priority change from the off-line scheduler 102. As described above, the on-line scheduler 101 executes a process schedule which is used as a key information upon storing data, and hence as a general rule, all the lots are covered by the scheduling. However, in the case where there are lots whose data need not be stored, such lots may be outside the coverage of scheduling, or there may be used a pseudo process table in which the step concerned is outside the coverage of scheduling. The process schedule of the on-line scheduler 101 together with process data from the machines (including manually input data) is stored in a data base 106.

The off-line scheduler 102 receives the registered information and processing results from the on-line scheduler 101, and executes a long period process schedule as well as estimate completion dates of TAT-controlled lots (high priority lots, important lots). Based on the results, the off-line scheduler 102 changes priority of each lot and sends the results to the on-line scheduler 101. The long period process schedule and results of processing of lots are displayed in the form of a lot-tracking chart 105 (Gantt chart) or the like. This plots the progress of each lot day after day (or hour after hour).

On the other hand, the on-line scheduler 101 is directly connected to the production line. The results of scheduling are used as a key information for work instruction or data storage. The progress management-/data collection system 103 receives process schedule (schedule data) from the on-line scheduler 101, and notifies the operator of it as work instruction 107 through a display machine (not shown). For example, process schedules are displayed with lots and steps to be processed in the day concerned being expressed on time axis. The operator confirms the contents and inputs signals for starting or ending the process through a user interface 108 to the on-line scheduler 101. On this occasion, a start command is issued for an automatically controlled or automatically data collecting machine/test machine 104 in order to start its control program 109. By execution of this control program 109, control of the production/test machine 104 or data collection is performed. Usually, process/test data from the machine 104 are unrecognizable, for example, as to which lot they are related, and therefore schedule data together with machine data are stored in the data base 106.

Figure 17:
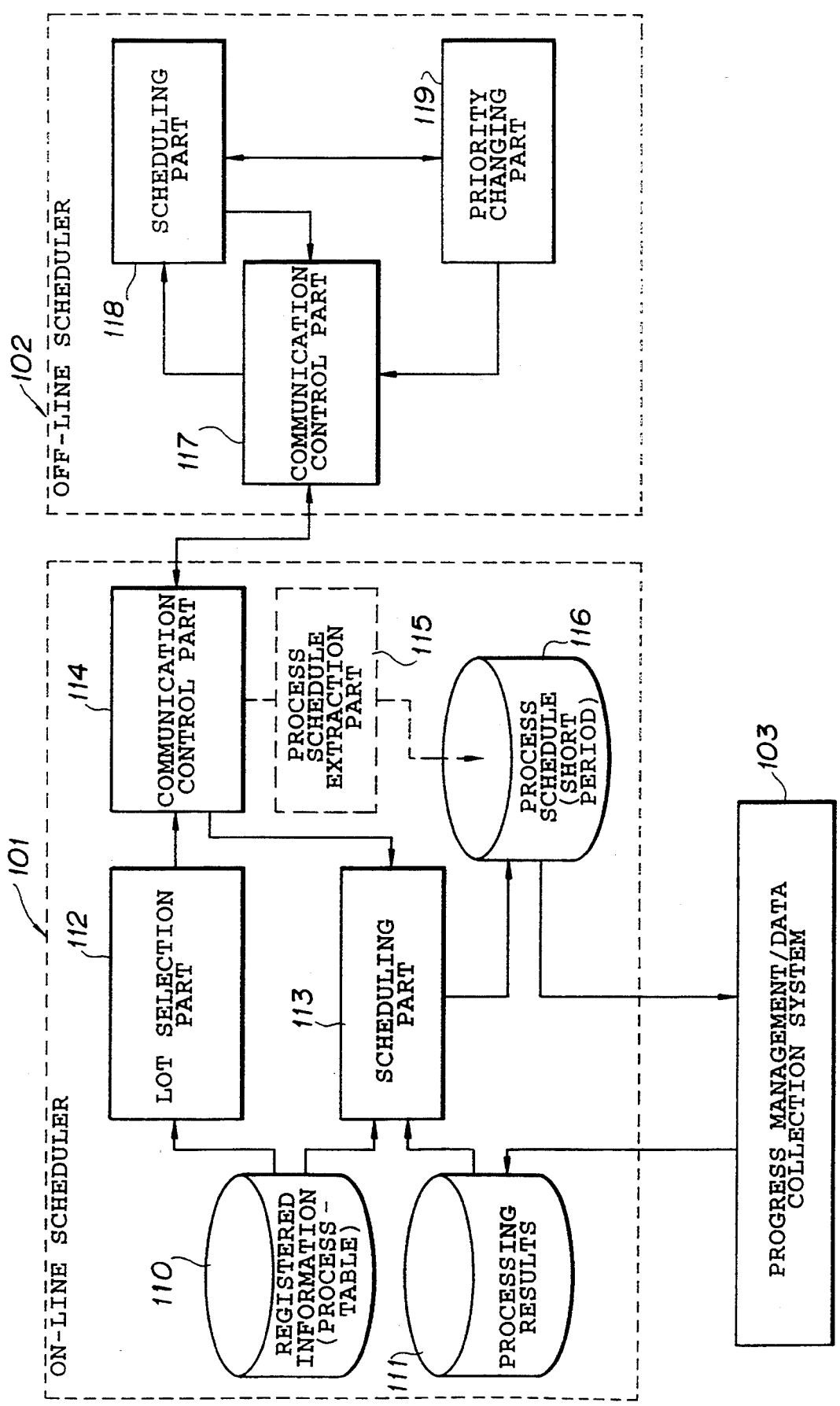
FIG. 17 is a block diagram showing a construction of the on-line scheduler and the off-line scheduler shown in FIG. 16.

FIG. 17 shows the arrangements of the on-line scheduler 101 and off-line scheduler 102. The on-line scheduler 101 has a data base for registered information 110 of each lot in the production line (data base which describes information such as lot name, process table used, delivery date, initial priority or present priority, machine, etc.), and a data base for process schedule and processing results 111 for each lot. The process schedule can be altered properly. Besides, the on-line scheduler 101 includes a lot selection part 112 which selects high priority lots or important lots from registered information on each lot (also serving as instruction means in claim 1), a scheduling part 113, and a communication control part 114 which transfers the information on the selected lot to the off-line scheduler 102. The communication control part 114 also receives information on priority or process schedule of a portion of lots from the off-line scheduler 102. Thus far is the basic construction of the on-line scheduler 101. In addition, the on-line scheduler 101 may have a process schedule extraction part 115 which extracts process schedules in order to reduce time required for the execution of the process schedules. On the other hand, the off-line scheduler 102 has a communication control part 117, a scheduling part 118 and a priority changing part 119 (priority changing means). Here, the functions of the lot selection part 112, the scheduling parts 113 and 118, the process schedule extraction part 117, and the priority changing part 119 can be realized by executing a software program by the scheduler 101 or 102.

Figure 18:
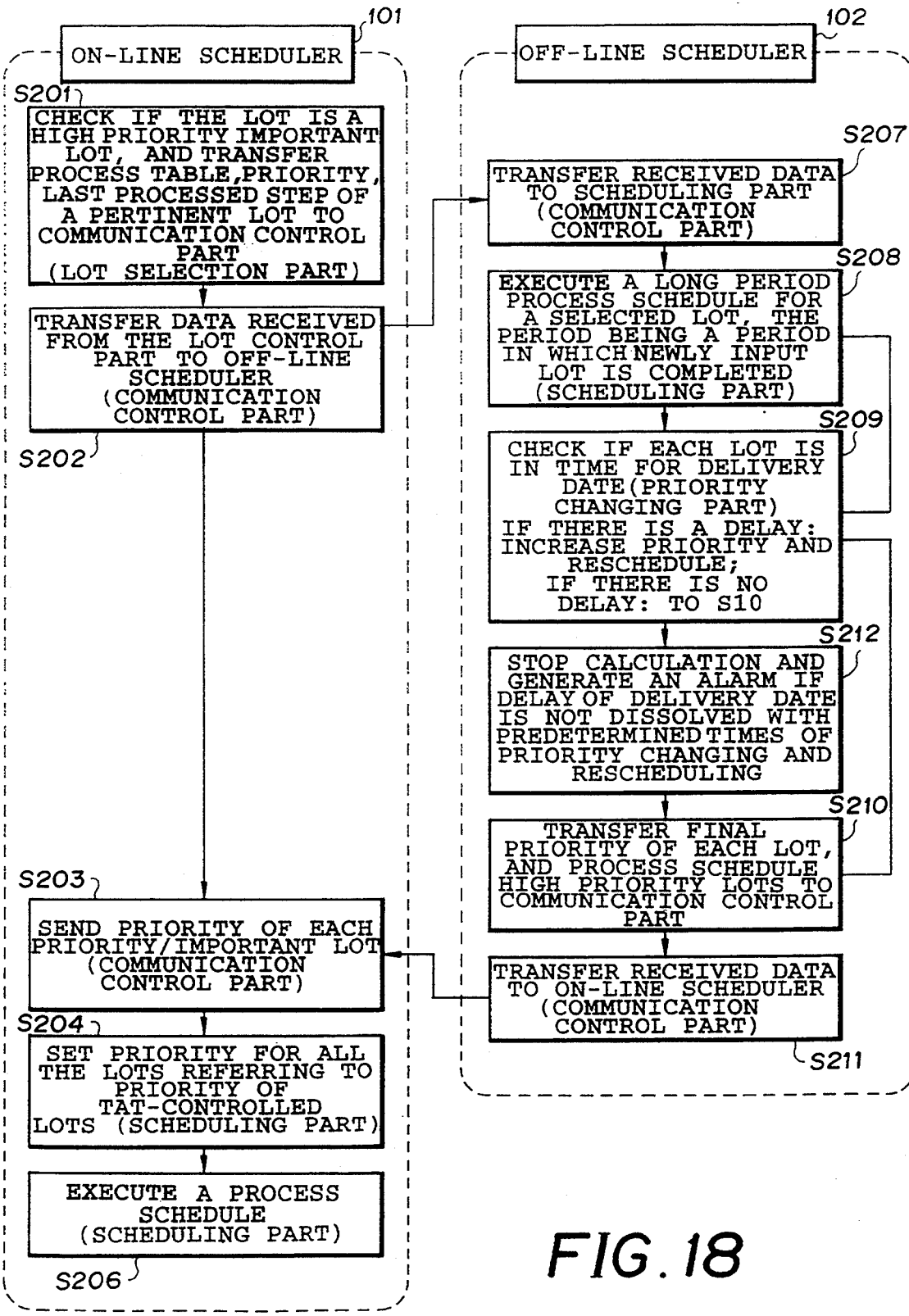
FIG. 18 is a flow chart illustrating a process procedure of the on-line scheduler and the off-line scheduler shown in FIG. 16.

Next, referring to FIG. 18, explanation will be made on the procedure of executing process schedules in the production management system of the present invention. In FIG. 18, steps S201 to S206 correspond to the procedure in the on-line scheduler 101 while steps S207 to S212 correspond to the procedure in the off-line scheduler 102.

First, each lot is checked to see if it is a high priority lot or an important lot in the lot selection part 112 in the on-line scheduler 101 with reference to the registered information, and transfers information on the lot such as process table, present priority (or initial value), and latest step processed to the communication control part 114 (step S201).

The communication control part 114 transfers the data from the lot selection part 112 to the communication control part 117 in the off-line scheduler 102 (step S201). Here, the lots to be selected include, in addition to the lots now on the production line, those lots to be input in future which have high priorities and importance.

On receipt of the information, the communication control part 117 in the off-line scheduler 102 transfers the data to the scheduling part 118. (step S207).

The scheduling part 118 executes process schedules for the selected lots (step S208). Scheduling period includes at shortest a period till completion of a newly input lot (latest input lot), and is usually several months. Information on scheduled completion date and priority for each lot calculated here is sent to the priority changing part 119.

The priority changing part 119 checks whether or not each lot is completed till its delivery date, changes priority if there is any delayed lot, performs rescheduling, and checks completion date (step S109).

If there is no delayed lot, the priority changing part 119 sends to the communication control part 117 information on priority at that point in time (priority as to which one is to precede when two or more lots are staying in the same machine) and process schedule of each lot (step S210).

On the other hand, if delay in delivery date is unavoidable instead of repeated change in priority and rescheduling, the priority changing part 119 stops the calculation and generates an alarm (step S212).

The communication control part 117 transmits the received data to the communication control part 114 in the on-line scheduler 101 (step S211). Here, it is also possible to transmit only the priority from the off-line scheduler 102, and perform scheduling anew for all the lots on the side of the on-line scheduler 101.

Details of priority change process are as follows. That is, priorities of those lots of which differences (allowances) between estimated completion date and delivery date are large are decreased, and on the contrary, priorities of those lots having small allowances therebetween are increased. It should be noted that the completion date is accurate since allocation is made step by step in each lot with checking the spare time of each machine unlike the conventional method in which inference is made by simply summing process times in respective machines or calculation is made by introducing statistically obtained value of stand-by time. As a result, accurate estimation of delivery date and progress management can be performed.

Since selection of lots is made in order to reduce the number of lots in the execution of process schedules in the off-line scheduler 102, execution of schedules on a scale of the whole production line results in excess of machine as compared with the number of lots, and lots proceed faster than in actual production. As a result, completion date is calculated to be prior to actual one. To prevent this, calculation is performed after decreasing the number of machines to an extent proportional to the selection ratio of lots when multiple machines are used in the production line. Whereas, if the number of machines cannot be reduced, a limitation is posed on the workable time of the machines to effectively or practically reduce the number of machines. Strictly speaking, upon calculation of completion date for high priority lots, it is correct that after calculation is performed on a regular line construction, the scale of the production line is reduced at the time of calculating low priority, but important lots (such as marker lots described later on). However, if priority lots are in a small number, schedules may be executed for a pseudo line whose scale has been reduced initially without so much deviation in estimated completion date. Reduction of the line scale may be practiced only on a few kinds of high operating efficiency machines which would be rate-limiting. Such an off-line scheduling is independent of the on-line scheduler 101 which gives work instruction to the operator, resulting in that rescheduling, if any, causes no harm to the actual operation by the operator.

After the aforementioned priority setting by the off-line scheduler 102 is over, the communication control part 114 of the on-line scheduler 101 receives the results, and transfers priority data to the scheduling part 113 of the on-line scheduler 101 (step S203).

The scheduling part 113 of the on-line scheduler 101 refers to the priority data, and reassign priority for all the lots (step S204). In this reassignment, high priority lots are kept as they are. With respect to lots not covered by the offline scheduling described above, the scheduling part 113 assigns priority with reference to the priority data given by the off-line scheduler 102 on the same kinds of lots. In other words, the lots are ranked so that preceding lots can be processed ahead.

Based on the priority data, the scheduling part 113 executes short period (usually a few days) process schedules for work instruction on all the lots (step S206).

While it is possible to perform rescheduling for all the lots in steps S203, S204 and S206, process schedules (long period schedules) for high priority lots are almost unaltered and hence execution time of process schedules for high priority lots may be reduced by the following method. That is, the on-line scheduler 101 is provided with a process schedule extraction part 115, in which the results (process schedules) of the off-line scheduler 102 are stored.

Figure 19:
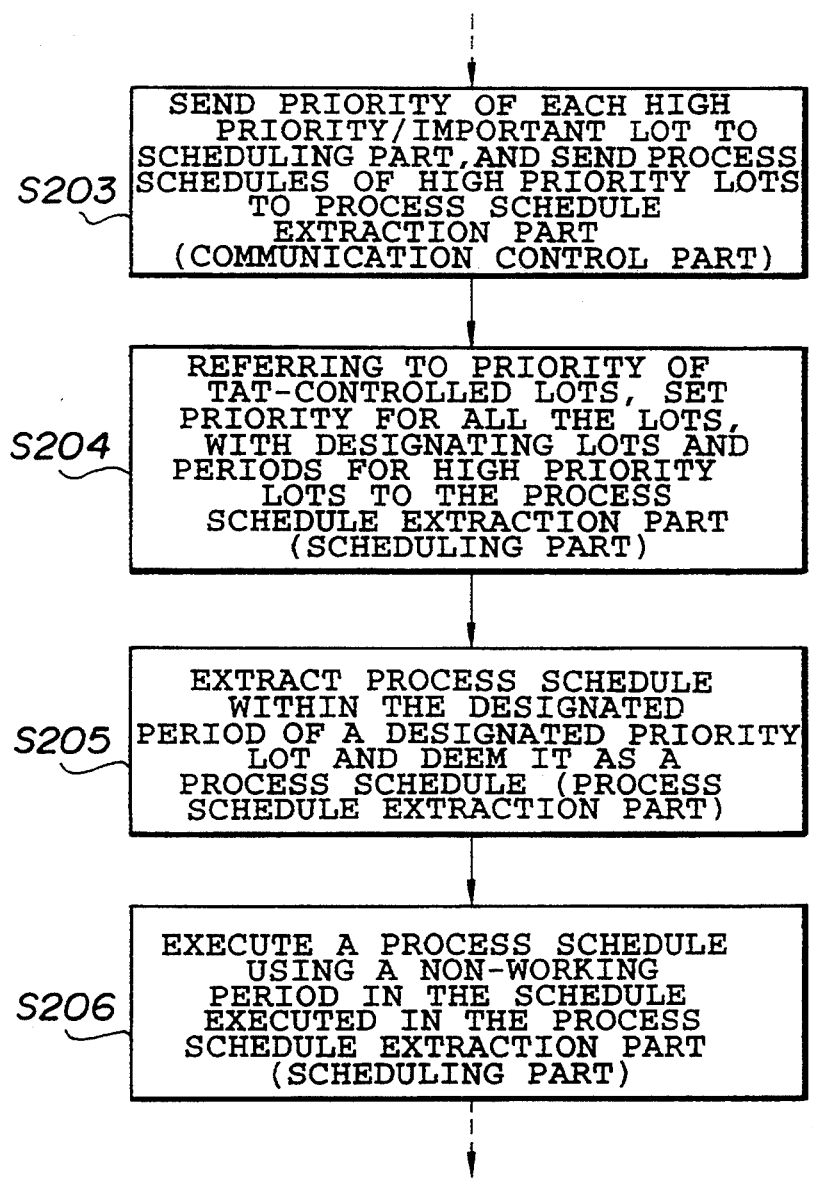
FIG. 19 is a flow chart illustrating other process procedures of the on-line scheduler.

FIG. 19 shows the procedure of executing process schedules in this case. In the procedure shown in FIG. 19, the processes in the steps S201, S202, and S207 to S212 are omitted. In the execution of process schedules in the on-line scheduler, steps S203 and S204 are the same as in FIG. 18, and then process schedules of the lots corresponding to the designated period are extracted and deemed as process schedules (S205). Process schedules for other lots are inserted in spare time regions in the extracted process schedules (S206).

To note, the on-line scheduling and off-line scheduling need not be performed simultaneously. For example, schedules of which priority has been assigned by the off-line scheduler 102 are stored in the on-line scheduler 101, and when the period of the schedules is within about 1 week, schedules are executed by the on-line scheduler 101 using the values shown in the schedules. With this, it is sufficient that the off-line scheduler 102 be started once a week.

In this production management method, the number of steps calculated at a time is small since the period of schedule is short on the side of the on-line scheduler 101 while the number of lots to be covered by scheduling is small on the side of the off-line scheduler 102. This makes it possible to execute an accurate production plan taking into consideration delivery date without limitations on calculation time and memory size. Therefore, the production management method of the present invention is applicable to production lines having large effective total lot numbers. Also, the off-line scheduler 102 can be used in simulation for the execution of lot input plans.

In the production management method shown in FIG. 18, objects of the off-line scheduling are high priority lots and important lots. In such a method, process schedules cannot be executed for general-purpose lots which are low in both priority and importance so that production plan and lot-tracking (process progress) management are difficult to perform. To overcome the defect s, a marker lot method can be used as a production management method in which process schedules are executed and time and memory size required for scheduling are reduced. Hereinafter, this method will be described in detail.

That is, there are a plurality of lots having different priorities on the production line. Among them, for high priority lots, the off-line scheduler 102 performs scheduling on all the steps, estimates completion date, and control progress in order to manage their delivery date. However, when scheduling is performed for only high priority lots, users cannot know progress of low priority lots. Accordingly, in the case of mass production articles such as gate array substrates (those lots using the same process table may be deemed as mass production lots despite the use of different masks) which are ranked low in priority, lots extracted at a fixed interval (for example, every 10 lots) from the mass production lots (marker lots) are treated as indices for progress management (delivery date management), and the off-line scheduler 102 performs scheduling on all the steps for the marker lots together with the high priority lots to estimate progress, and changes the priority, followed by inputting next lots.

Figure 20:
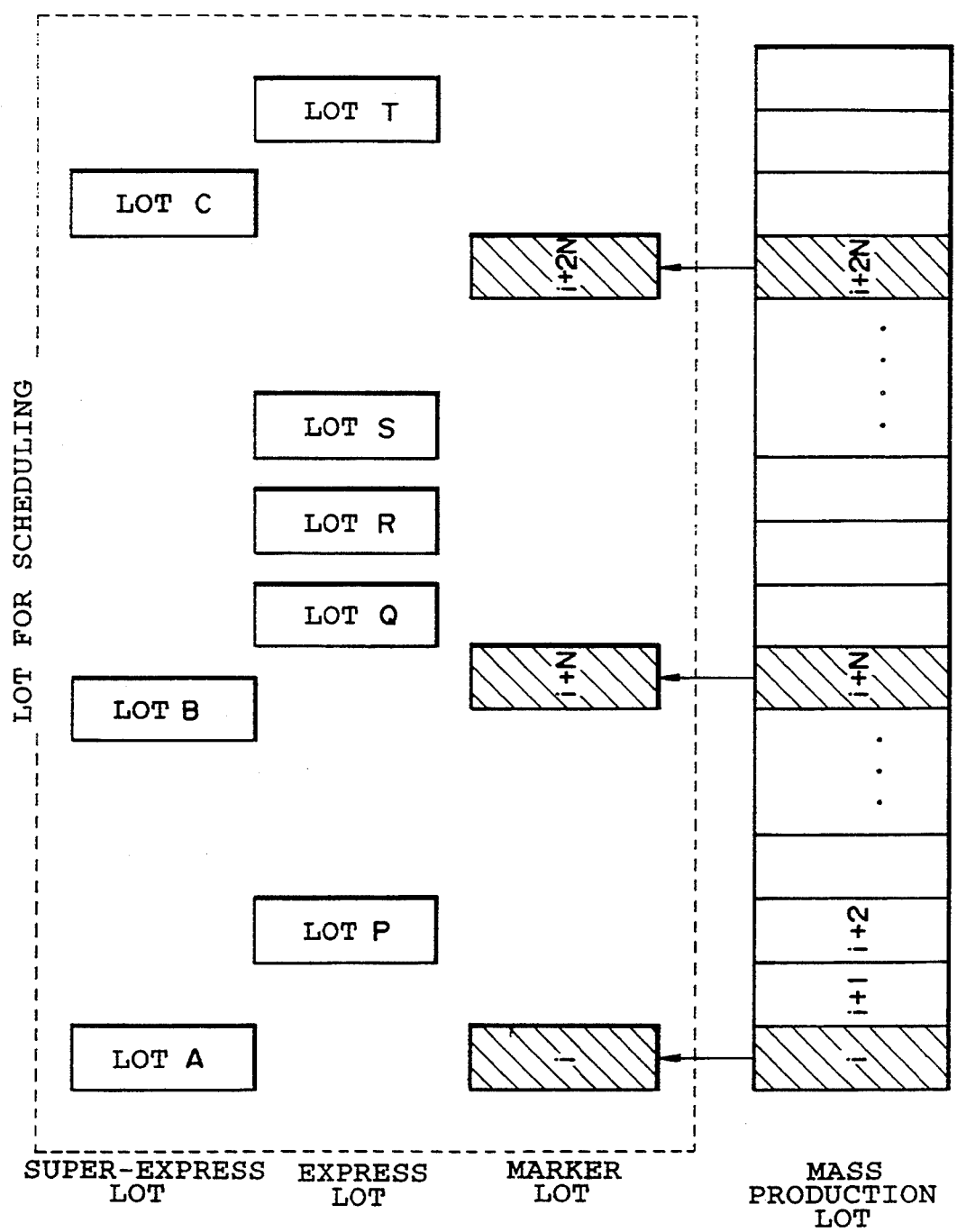
FIG. 20 is a diagram illustrating contents of process in case of progress management using marker lots.

More specifically, in case where there are mass production lots $Ci, Ci+1, \ldots, Ci+N, \ldots$, as shown in FIG. 20, every N-the lot is elected as a marker lot and the off-line scheduler 102 executes process schedules for the thus obtained marker lots. Upon executing the process schedules, users can designate lot input timing or starting step on the day (or give a notice on the latest step at a predetermined time) so that the off-line scheduler 102 can execute process schedules well matching to processes on actual production line, and manage progress of lots on the production line efficiently. On the other hand, lots other than the marker lots are processed in the order they are input. That is, if a rule is established in advance that when a plurality of lots are staying and standing-by for a process in the same step, an earlier input lot takes precedence in processing (first-in first-out condition), then the scheduler 102 can perform a rough lot-tracking management for other non-marker lots sandwiched by the two marker lots. Data collection for the marker lots can be processed in the same manner as in the case of lots for which ordinary scheduling is performed.

Figure 21:
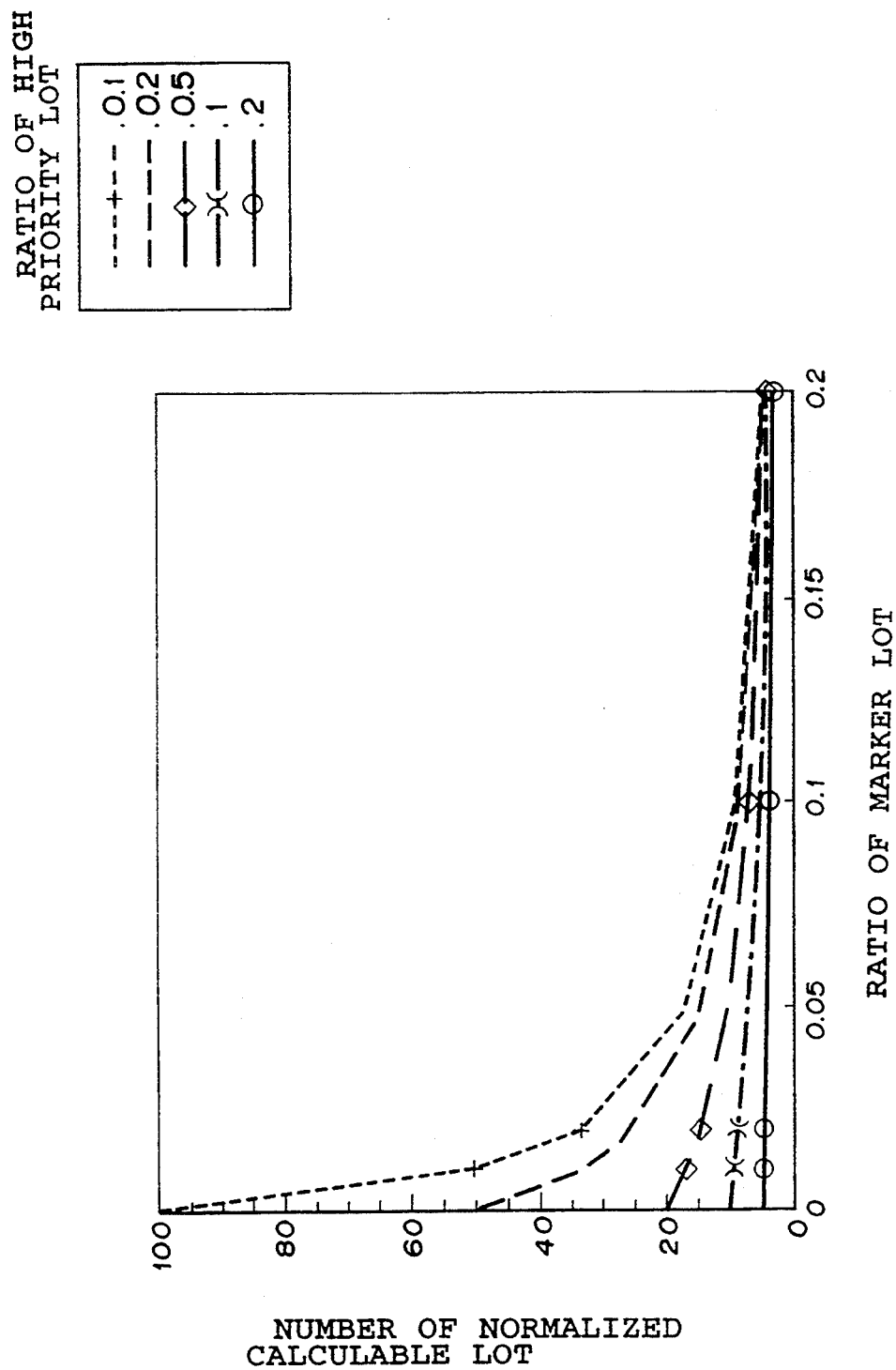
FIG. 21 is a graph illustrating change in the number of calculable lots when marker lots are used.

FIG. 21 illustrates effects obtained by the use of marker lots. In FIG. 21, the number of lots which can be calculated using a usual method in which scheduling is performed for all the lots and for all the steps (i.e., the number of lots for which delivery date can be simulated) is taken as unity (1), and the proportions of high priority lots and marker lots, respectively, thereto are plotted against the number of lots which can be calculated. For example, when the proportion of the high priority lots is 0.01 (1%), scheduling is performed for the marker lots in a proportion of 5%, i.e., 1 lot per 20 lots, the number of object lots of scheduling can be expanded to 15 times as large as the lot number that can be handled by the conventional method. If the object lots of scheduling include no high priority lot, the amount of calculation decreases in proportion to the proportion of the maker lots. Considering a mass production line in which 100 lots are input a day (30,000 lots a year), and assuming 1 lot per 100 general-purpose lots input on the day is a marker lot, lot-tracking (process progress) can be managed with a delay of at most 1 day. The amount of calculation in this case is 1/100 as much as the conventional case, and it is sufficient to use even a scheduler which can handle 300 lots is sufficient. If it is sufficient to manage lot-tracking with a precision of about 2 days, the scheduler to be used may be the one which can handle only 150 lots, i.e., half the ability of the aforementioned scheduler. As described above, the marker lot method is very efficient when applied to mass production lines.

Now, in the on-line scheduler 101 shown in FIG. 16, all the steps are scheduled for the TAT-controlled lots (including marker lots) with reflecting the priority data in the schedules executed by the off-line scheduler. As a result, the both schedulings give basically the same process schedule. In contrast, concerning the schedules for general-purpose lots which are neither TAT-controlled lots nor marker lots, scheduling can be performed on all the steps as they are since the schedule time is short. However, when marker lots are used, it is not always necessary to execute process schedules on all the steps for those lots other than TAT-controlled ones. In other words, process schedules can be used not only for estimation of lot-tracking and delivery date management but also as a key information upon storing data. In the latter case, data storing cannot be performed without schedule information (schedule table information), and for this reason all the lots have to be covered by scheduling in the production management system in which schedule information is used upon data storage. However, this scheduling does not have to be timely accurate scheduling since it is not for the estimation of lot-tracking. It is only necessary for the production management system to execute process schedules for those machines of which the users would like to know accurate time of process occurred therein and the users would like to obtain data. In this case, it is sufficient to execute process schedules using a pseudo process table. The pseudo process table will be explained hereinbelow.

Figure 22:
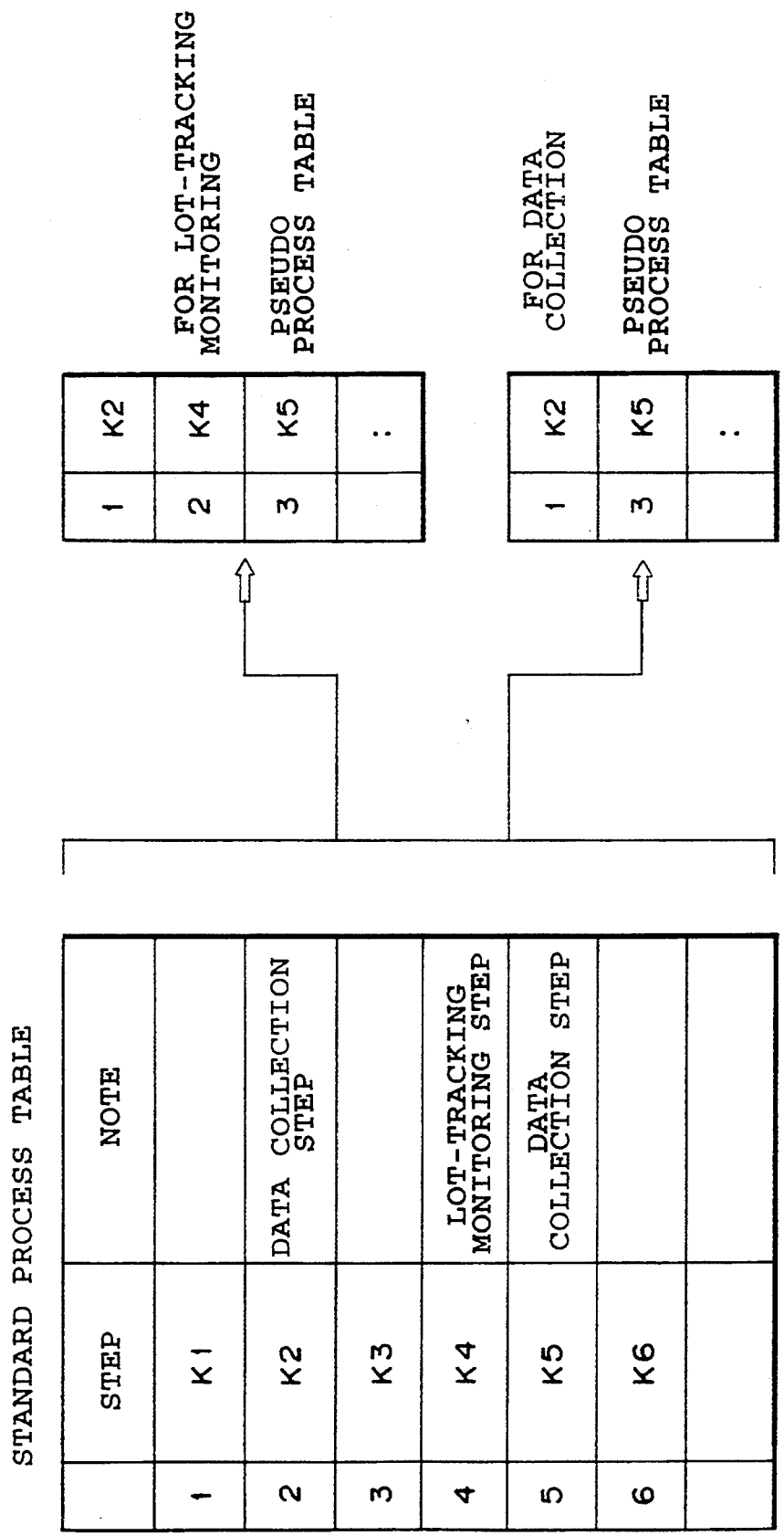
FIG. 22 is a diagram illustrating a procedure for preparing a pseudo process table.

Pseudo process table is a process table of which schedules cover only data collection steps and minimum steps necessary for managing lot-tracking (i.e., steps displayed in the lot-tracking chart). Actual scheduling process is performed based on the work instruction in a standard process table. FIG. 22 is a diagram illustrating the concept of a pseudo process table. The process table contains, for example, test step and the like in which data are always obtained (K2, K5), lot-tracking monitoring step which monitors lot-tracking by displaying on a lot-tracking chart 5 (K4), and other steps. As for the TAT-controlled lots consisting of high priority lots and marker lots, all the steps of these lots are covered by scheduling, and hence the original process table is used as it is. As for those lots on which only data collection is performed but no lot-tracking management is carried out, there is used a pseudo process table for data collection consisting of data collection step only, for example, a process table for only size measurement, film thickness measurement, etc. The use of the pseudo process table, on one hand, enables the production management system to reduce the memory size and process time upon scheduling, and on the other hand, enables the operator to collect data in the same procedure as the case where there are process schedules based on a regular process table, resulting in reduction in the occurrence of misoperation. In this case, process schedules of pseudo steps are inserted between marker lots before a command is sent to each machine. Upon on-line scheduling, both short period standard scheduling and pseudo scheduling are performed simultaneously in the production management system; at first steps for high priority lots are reserved, and then pseudo scheduling is performed in resultant spare time regions. Therefore, the pseudo scheduling does not alter the contents of the standard scheduling. In the case of wafer processing according to pseudo scheduling (TAT-uncontrolled lots), the work instruction is separately given based on the standard process table, and the wafer process is performed among TAT-controlled lots by a production management technique such as a stacking method, or a kanban method.

The method of executing schedules using the pseudo process table of the production management system as shown in FIG. 17 will be explained in more detail below.

Figure 23:
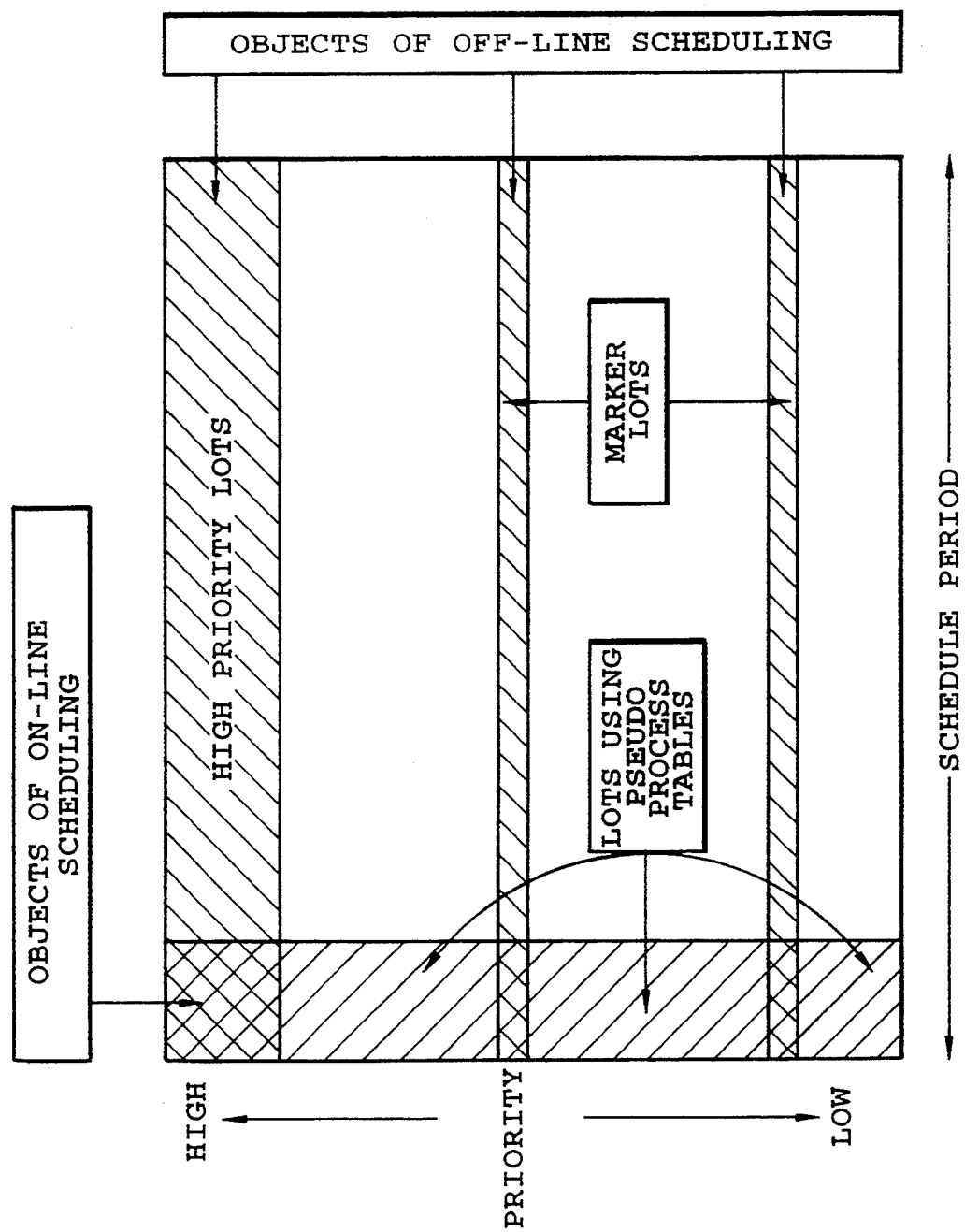
FIG. 23 is a diagram illustrating a procedure for executing a schedule.

While TAT-controlled lots aimed at TAT management (lot-tracking management such as estimation of completion date, etc.) need long period scheduling, it is sufficient for pseudo scheduling for data storage to execute schedules for several days. Therefore, it is impossible to perform long period scheduling for TAT-controlled lots only, and short period scheduling in order to execute process schedules for data storage for all the lots (including TAT-uncontrolled lots based on pseudo process table). The latter scheduling must be performed by the on-line scheduler 101 directly connected to the data collection system 103. However, in the system of the present invention, the former scheduling is performed by the off-line scheduler 102. Thus, in the system of the present invention, schedules for TAT-controlled lots and those for TAT-uncontrolled lots are shared by two separate schedulers. FIG. 23 illustrates this concept.

In FIG. 23, hatched portion represents TAT-controlled lots in the hatched regions A including high priority lots and maker lots, for which long period scheduling is executed by the off-line scheduler 102. From the results, the off-line scheduler 102 increases the priorities of those lots which are supposed to be late in delivery date, and decreases the priorities of those lots which have allowances till delivery dates. Based on the off-line schedule reflecting changes in priority, the on-line scheduler 101 executes short period, all-lot scheduling for lots in the hatched region B. On this occasion, there are executed simultaneously standard scheduling and pseudo scheduling for data collection on TAT-uncontrolled lots, and steps for high priority lots are reserved, and then pseudo scheduling is executed in resultant spare time regions. Therefore, the results of the on-line scheduling for high priority lots are the same as the contents of the off-line scheduling. Usually, the schedule period by the off-line scheduler 102 extends over 2 or 3 months since delivery dates are calculated. On the other hand, the on-line scheduler 101 executes process schedules for several days. The scheduling results may be altered properly according to the progress of the process. The timing of such a rescheduling may be periodical. For example, the on-line scheduler 101 may execute renewed schedules at a predetermined time in each day, and the off-line scheduler 102 once a week. Alternatively, the rescheduling may be executed at a non-periodical timing such that rescheduling is executed when progress of lots is delayed by a predetermined time (for example, 1 day) from the initial process schedule.

Various variations may be made to the embodiments described above. For example, the scheduler may execute long period schedules for high priority lots, and automatically performs lot-tracking management. For low priority lots, the scheduler may execute only short period schedules, and leave the lot-tracking management to users discretion. In addition, information used for the execution of schedules by the scheduler may be input manually through a keyboard, or may be obtained from the data base shown in FIG. 16 by reference thereto.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A production management system comprising:
   a host computing machine serving as a scheduler which executes production schedules for a plurality of production machines, forming a production line, and/or articles to be processed which are objects of production processes by the production machines based on first information on production abilities of the machines and second information on state quantity of the articles to be processed by the machines;
   a computer associated with each production machine for distributing said schedules to each production machine and reporting to said scheduler on progress of said production process for each production machine;
   an input means for inputting to said scheduler third information on degrees of production progress on said production machines and/or said articles to be processed;
   a judgment means for comparing said input third information with said production schedules and for judging if said degrees of production progress are within predetermined allowances on said production machines and/or said articles to be processed;
   an adjustment means for adjusting said production schedule so as to match predetermined production target if negative judgment is given by said judgment means;
   a designating means for designating at least one article to be processed having high priority or importance, forming a first article group, from said articles to be processed which are objects of said production processes, the rest forming a second article group, said designated at least one article to be processed which is an object of said execution of said production schedules to execute a first production schedule, and of said adjustment; and
   an extraction means for extracting marker articles to be processed at a predetermined interval from said second article group, said extracted marker articles to be processed which are treated as said articles to be processed in said first article group.

2. A production management system comprising:
   a host computing machine serving as a scheduler which executes production schedules for a plurality of production machines, forming a production line, and/or articles to be processed which are objects of production processes by the production machines based on first information on production abilities of the machines and second information on the quantity of the articles to be processed by the machines;
   a computer associated with each production machine for distributing said schedules to each production machine and reporting to said scheduler on progress of said production process for each production machine;

an input means for inputting to said scheduler third information on degrees of production progress on said production machines and/or said articles to be processed;

a judgment means for comparing said input third information with said production schedules and for judging if said degrees of production progress are within predetermined allowances on said production machines and/or said articles to be processed;

an adjustment means for adjusting said production schedule so as to match predetermined production target if negative judgment is given by said judgment means;

a first virtual production lane having a distribution ratio of resources in which production process of said at least one article to be processed having high priority or importance is performed, and a second virtual production lane in which production process of the rest of said articles to be processed in said production line other than said at least one article to be processed having high priority or importance is performed;

said first and second virtual production lanes being assigned in advance, and wherein said adjustment means adjusts said schedules so that said distribution ratio of resources relating to said first virtual production lane increase when a result of said judgment by said judgment means is negative.

3. A production management system comprising:

a host computing machine serving as a scheduler which executes production schedules for a plurality of production machines, forming a production line, and/or articles to be processed which are objects of production processes by the production machines based on first information on production abilities of the machines and second information on the quantity of the articles to be processed by the machines;

a computer associated with each production machine for distributing said schedules to each production machine and reporting to said scheduler on progress of said production process for each production machine;

an input means for inputting to said scheduler third information on degrees of production progress on said production machines and/or said articles to be processed;

a judgment means for comparing said input third information with said production schedules and for judging if said degrees of production progress are within predetermined allowances on said production machines and/or said articles to be processed;

an adjustment means for adjusting said production schedule so as to match predetermined production target if negative judgment is given by said judgment means;

a designating means for designating at least one article to be processed having high priority or importance, forming a first article group, from said articles to be processed which are objects of said production processes, the rest forming a second article group, said designated at least one article to be processed which is an object of said execution of said production schedules to execute a first production schedule, and of said adjustment; and a scheduling means for executing a second production schedule for said articles processed in said second article group, said second production schedule which is shorter than said first production schedule for said articles to be processed in said first article group.

4. The production management system as claimed in claim 3, further comprising:

an extraction means for extracting marker articles to be processed at a predetermined interval from said articles to be processed in said second article group, and wherein said extracted marker articles to be processed are treated as said articles to be processed in said first article group.

5. The production management system as claimed in claim 3, wherein said second production schedule includes information on completion date of said articles to be processed in said second article group, and said system further comprising:

a priority changing means for checking if said completion date in said information is in time for a predetermined delivery date, and changing priority of said articles to be processed in said second article group so that said articles to be processed in said second article group are treated as said articles to be processed in said first article group.

6. The production management system as claimed in claim 5, further comprising:

an extraction means for extracting marker articles to be processed at a predetermined interval from said articles to be processed in said second article group, and wherein said extracted marker articles to be processed are treated as said articles to be processed in said first article group.

7. A production management method using a scheduler, comprising the steps of:

providing first information on production abilities of a plurality of production machines forming a production line and second information on the quantity of articles to be processed that are objects of production processes by said production machines;

designating at least one specified article to be processed as an object of first scheduling by said scheduler from among said articles to be processed that are objects of said production processes and inputting this information to said scheduler, said at least one specified article being one member selected from the group consisting of an article to be processed having high importance and an article to be processed having high priority;

designating the rest of said articles to be processed in said production line other than said at least one article to be processed having high priority or importance as objects of second scheduling by said scheduler;

forming a first virtual production lane having a distribution ratio of resources in which a production process of said at least one article to be processed having high priority or importance is performed;

forming a second virtual production lane in which a production process of the rest of said articles to be processed in said production line other than said at least one article to be processed having high priority or importance is performed;

executing first and second production schedules for said at least one designated article in said first virtual production lane and for said articles to be processed in said second virtual production lane, respectively, both based on said first and second information;

monitoring production progress of said at least one designated article in said first virtual production lane, based on said executed production schedules; and automatically adjusting said first and second production schedules for said at least one designated article in said first virtual production lane so that said distribution ratio of resources relating to said first virtual production lane increases if said production progress of said at least one designated article in said first virtual production lane is delayed.

8. A production management method using a scheduler, comprising the steps of:

providing first information on production abilities of a plurality of production machines forming a production line and second information on the quantity of articles to be processed that are objects of production processes by said production machines;

designating at least one specified article to be processed as an object of long period scheduling from among said articles to be processed that are objects of said production processes, and the rest of said articles to be processed that are objects of said production processes as objects of short period scheduling, and inputting this information to said scheduler;

executing long period production schedules and short period production schedules according to a kind of said scheduling for said designated articles to be processed, based on said first and second information;

executing a production schedule for a whole production system by synthesizing said executed long term production schedules and said executed short period production schedules;

monitoring production progress of said at least one specified articles to be processed and the rest of said articles to be processed that are objects of production processes, based on said executed production schedule for said whole production system; and adjusting said production schedule for said whole production system with respect to said articles to be processed whose production progresses are delayed, based on results of said monitoring, wherein said at least one specified article is one member selected from the group consisting of an article to be processed having high importance, an article to be processed having high priority, and a marker article to be processed.

9. A production management method using a scheduler, comprising the steps of:

providing first information on production abilities of a plurality of production machines forming a production line and second information on the quantity of articles to be processed that are objects of production processes by said production machines;

providing first and second schedulers which perform first and second schedulings, respectively;

said first scheduling comprising the steps of:

designating at least one specified article to be processed as object of long period scheduling from among said articles to be processed that are objects of said production processes, and inputting this information to said first scheduler;

executing long period production schedules for said designated at least one specified articles to be processed, based on said first and second information;

monitoring production progresses of said at least one specified articles to be processed, based on said executed long period production schedule;

automatically adjusting said long period production schedule with respect to said articles to be processed whose production progresses are delayed, based on results of said monitoring; and transferring said executed or adjusted long period production schedule to said second scheduler; and said second scheduling comprising the step of:

executing a short period production schedule for whole articles to be processed that are object of said production processes, based on said first and second information, using said long term production schedules transferred from said first scheduler.

10. The production management method as claimed in claim 9, wherein said at least one specified article is one member selected from the group consisting of an article to be processed having high importance, an article to be processed having high priority, and a marker article to be processed.

* * * * *

UNITED STATES PATENT AND TRADEMARK OFFICE
CERTIFICATE OF CORRECTION

PATENT NO. : 5,442,561

DATED : August 15, 1995

INVENTORS : Yoshizawa et al.

It is certified that an error appears in the above-identified patent and that said Letters Patent is hereby corrected as shown below.

In column 30, in line 22, delete "state" and replace therein --the--.

Signed and Sealed this

Fourteenth Day of November, 1995

Attest:

BRUCE LEHMAN

Attesting Officer

Commissioner of Patents and Trademarks